US010921523B2

(12) United States Patent
Cippant et al.

(10) Patent No.: US 10,921,523 B2
(45) Date of Patent: Feb. 16, 2021

(54) DISPLAY SYSTEM AND COMPONENTS

(71) Applicant: L-3 Technologies, Inc., New York, NY (US)

(72) Inventors: Kevin P. Cippant, Mansfield, TX (US); Jonathan Gabel, Arlington, TX (US); James A. Turner, Binghamton, NY (US)

(73) Assignee: L-3 Technologies, Inc., New York, NY (US)

( * ) Notice: Subject to any disclaimer, the term of this patent is extended or adjusted under 35 U.S.C. 154(b) by 0 days.

(21) Appl. No.: 16/331,026

(22) PCT Filed: Sep. 25, 2017

(86) PCT No.: PCT/US2017/053264
§ 371 (c)(1),
(2) Date: Mar. 6, 2019

(87) PCT Pub. No.: WO2018/058043
PCT Pub. Date: Mar. 29, 2018

(65) Prior Publication Data
US 2019/0250332 A1 Aug. 15, 2019

Related U.S. Application Data

(63) Continuation-in-part of application No. 15/335,057, filed on Oct. 26, 2016, now abandoned.
(Continued)

(51) Int. Cl.
*G02B 6/26* (2006.01)
*G03B 21/60* (2014.01)
(Continued)

(52) U.S. Cl.
CPC ............. *G02B 6/262* (2013.01); *G03B 21/60* (2013.01); *G03B 37/04* (2013.01); *G09B 9/302* (2013.01); *H04N 9/3147* (2013.01)

(58) Field of Classification Search
CPC .......... G09G 3/34–3426; G09G 2300/02–026; G09G 2360/04; G09G 2360/06;
(Continued)

(56) References Cited

U.S. PATENT DOCUMENTS

| 5,130,794 A | 7/1992 | Ritchey |
| 5,253,116 A | 10/1993 | Lacroix |

(Continued)

FOREIGN PATENT DOCUMENTS

| CN | 202711613 U | 1/2013 |
| CN | 104021737 A | 9/2014 |

(Continued)

OTHER PUBLICATIONS

Hiroo Iwata, "Rear-projection-based Full Solid Angle Display" (from ICAT '96 Proceeding). http://intron.kz.tsukuba.ac.ip/gametvision/papar/icat96.html, 1996.
(Continued)

*Primary Examiner* — Nathan Danielsen
(74) *Attorney, Agent, or Firm* — Tiajoloff & Kelly LLP

(57) ABSTRACT

A display system comprises a screen having a concave spherical surface positioned so as to be visible to a user of the system. The screen comprises a plurality of kite-shaped screen elements supported adjacent one another so as to form that spherical surface. Each of the screen elements comprises a respective faceplate comprising optical fibers extending adjacent each other so as to transmit light therethrough between two opposing face surfaces. One of the face surfaces is a concave spherical display image output surface, and the other of the face surfaces is a substantially planar (Continued)

image input surface. The screen elements also each comprise a respective image panel having a field of pixels each transmitting light corresponding to serial images of said panel. The fibers of the faceplate receive the light of the pixels of the image panel and together transmit the light from the image panel coherently to its image output surface so that the images of the panel are displayed on the image output surface.

26 Claims, 32 Drawing Sheets

Related U.S. Application Data

(60) Provisional application No. 62/399,093, filed on Sep. 23, 2016.

(51) Int. Cl.
*H04N 9/31* (2006.01)
*G03B 37/04* (2021.01)
*G09B 9/30* (2006.01)

(58) Field of Classification Search
CPC .... G06F 3/1423–1446; G02B 6/04–08; G02B 6/26; G02B 6/262; G03B 21/54; G03B 21/56; G03B 21/60–625; G03B 37/00–06; G09B 9/30–38; H04N 9/315–3167
See application file for complete search history.

(56) References Cited

U.S. PATENT DOCUMENTS

| | | | |
|---|---|---|---|
| 5,703,604 A | 12/1997 | McCutcheon | |
| 6,141,034 A | 10/2000 | McCutcheon | |
| 6,142,635 A | 11/2000 | Kasahara et al. | |
| 6,215,593 B1* | 4/2001 | Bruce | G02B 6/08 |
| | | | 359/619 |
| 7,352,340 B2 | 4/2008 | Utt et al. | |
| 7,663,793 B1 | 2/2010 | Doucet | |
| 8,102,395 B2 | 1/2012 | Kondo et al. | |
| 9,188,850 B2 | 11/2015 | Turner et al. | |
| 2002/0130982 A1 | 9/2002 | Marshall | |
| 2004/0108806 A1* | 6/2004 | Cok | H01L 51/5281 |
| | | | 313/504 |
| 2004/0257435 A1* | 12/2004 | Clinton | G09F 19/12 |
| | | | 348/36 |
| 2009/0066858 A1 | 3/2009 | Turner et al. | |
| 2010/0097304 A1 | 4/2010 | Vidal et al. | |
| 2010/0300006 A1 | 12/2010 | Magpuri | |
| 2012/0247030 A1 | 10/2012 | Magpuri | |
| 2016/0240013 A1 | 8/2016 | Spitzer | |
| 2016/0309065 A1* | 10/2016 | Karafin | H04N 5/3696 |

FOREIGN PATENT DOCUMENTS

| | | |
|---|---|---|
| CN | 204013908 U | 12/2014 |
| CN | 102968937 B | 2/2015 |
| CN | 105161006 A | 12/2015 |
| CN | 105894971 A | 8/2016 |
| GB | 2 349 236 B | 10/2000 |
| WO | 02/03121 A2 | 1/2002 |
| WO | 02/03121 A2 | 5/2002 |

OTHER PUBLICATIONS

Hiroo Iwata, "Full-Surround Image Display Technologies". International Journal of Computer Vision, Jul. 2004, vol. 58, Issue 3, pp. 227-235. http://dl.acm.org/citation.cfm?id=974018.
JoAnn Kuchera-Moran, et al. "Immersive Full-Surround Multi-User System Design". Computers & Graphics, v. 40 (2014), p. 10-21.
Ed Lantz. "Spherical Image Representation and Display: A New Paradigm for Computer Graphics". Siggraph 1995, Course #2-Graphics Design and Production for Hemispheric Projection.
Tobias Hoeller, et al. "The Allosphere: A Large-Scale Immersive Surround-View Instrument". Emerging Display Technologies, 2007.
English Abstract for CN105161006 A, Dec. 16, 2015.
English Abstract for CN105894971 A, Aug. 24, 2016.

* cited by examiner

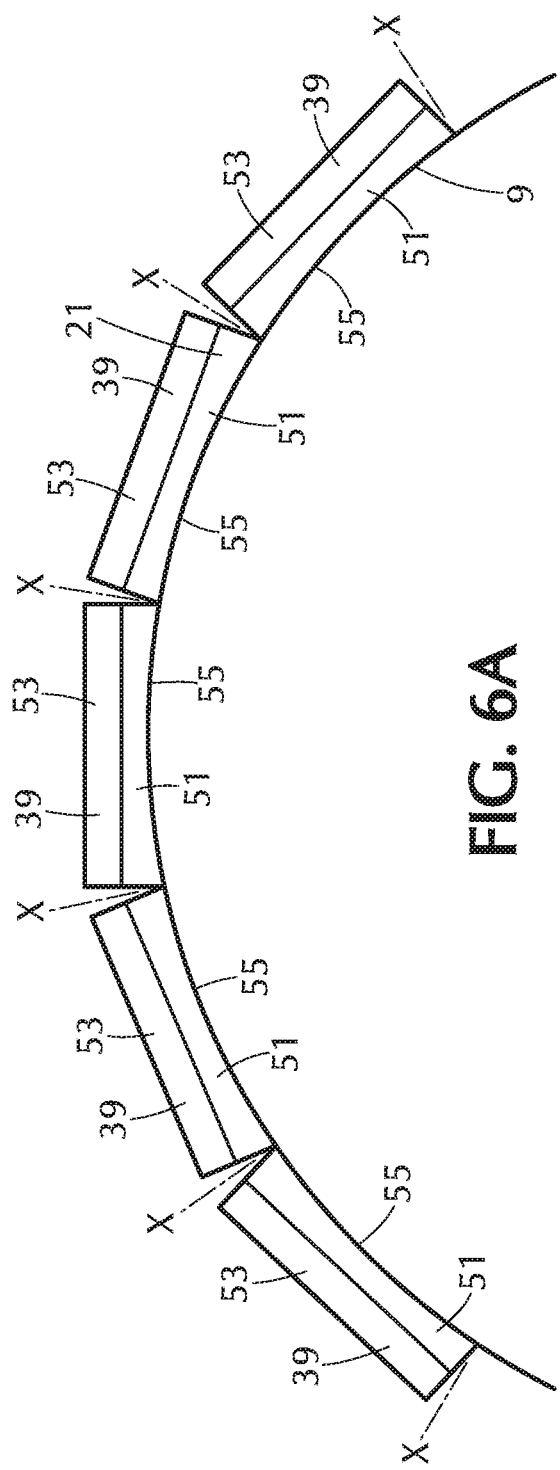

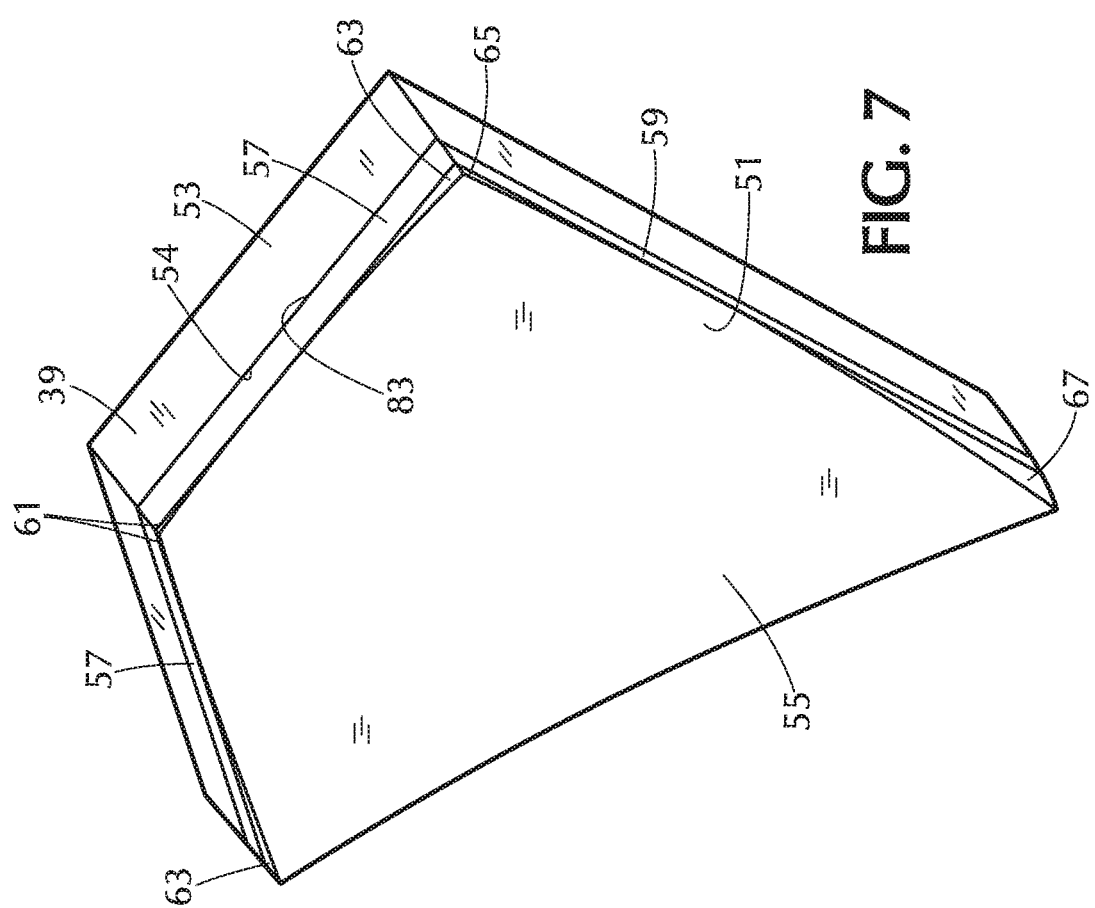

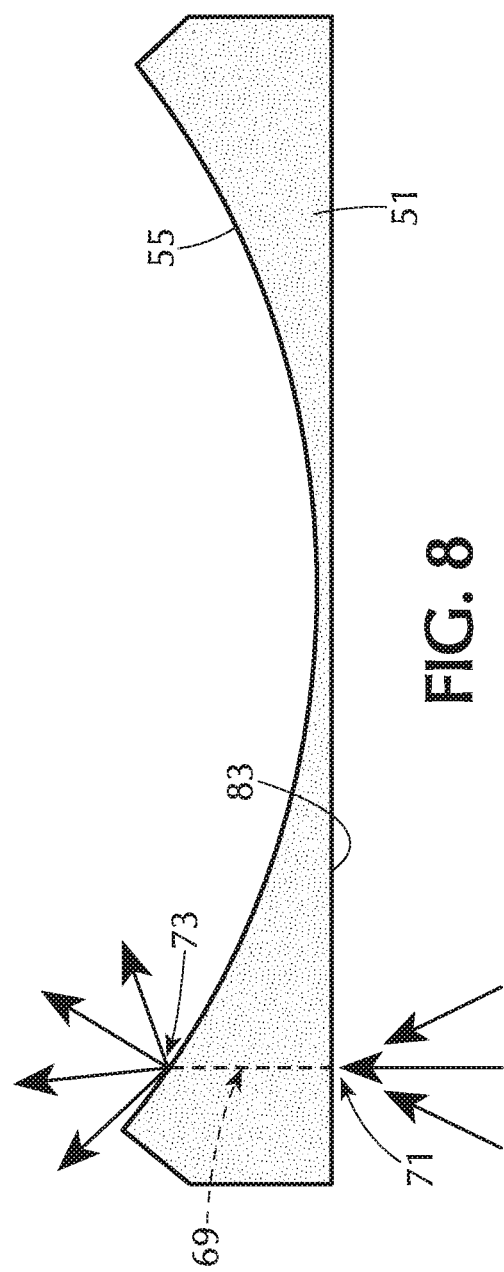

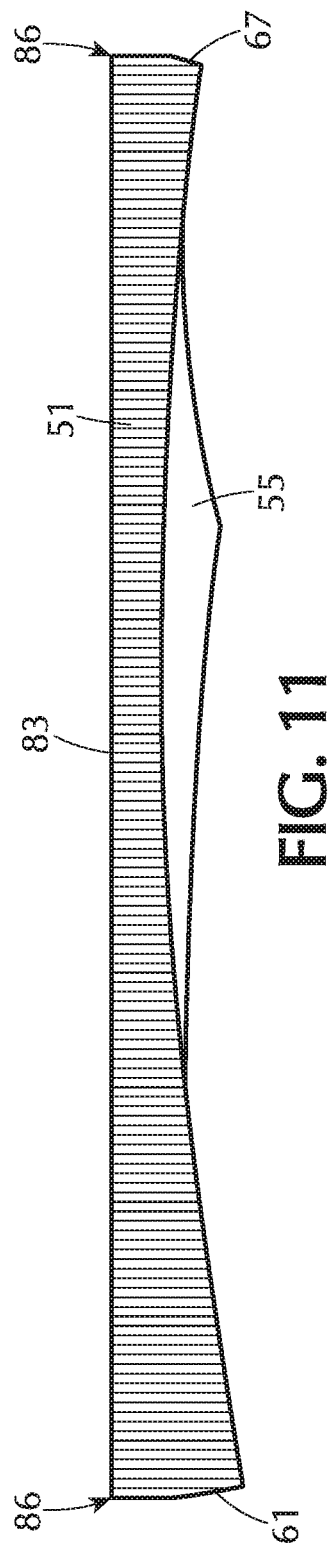
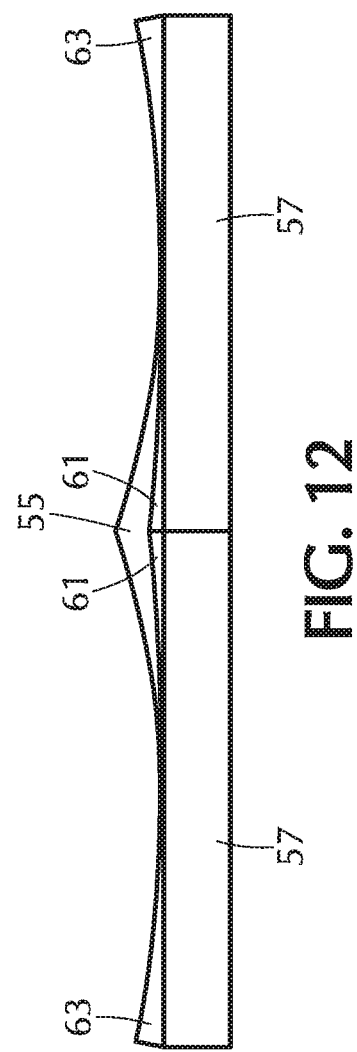
FIG. 11
FIG. 12

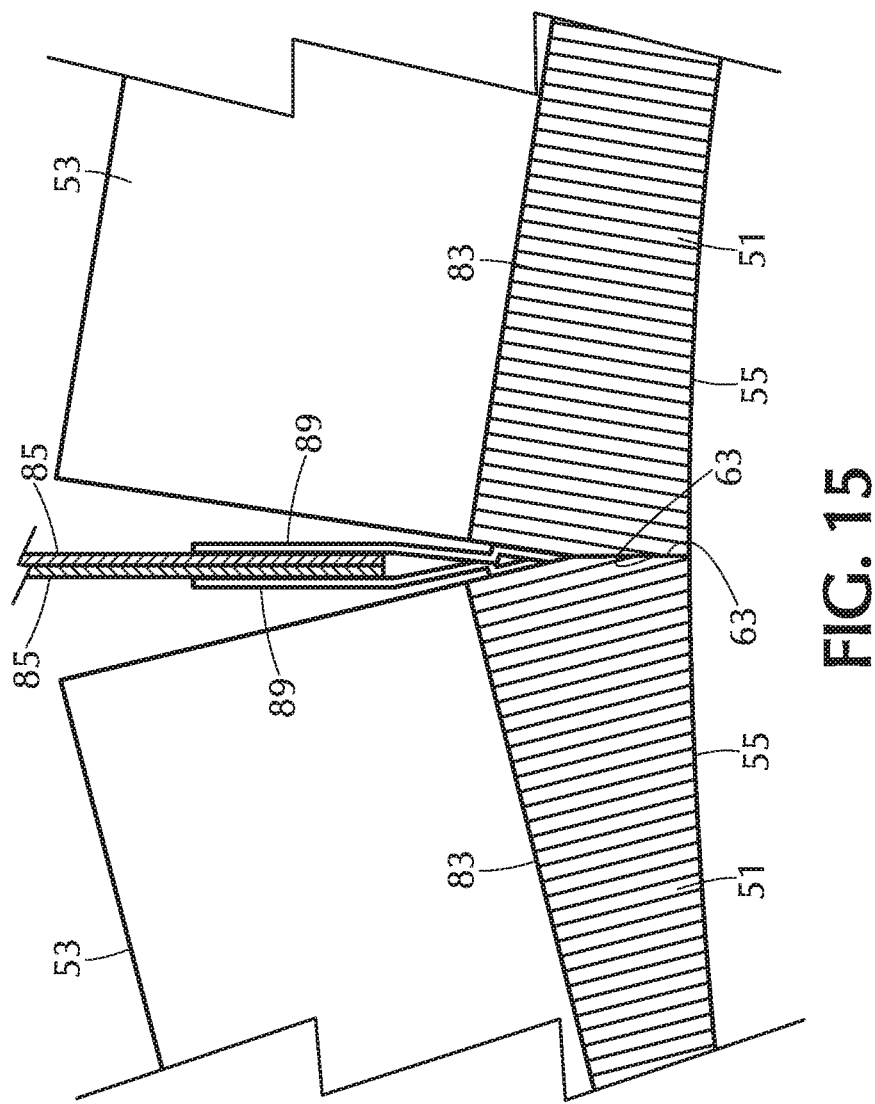

DISPLAY SYSTEM AND COMPONENTS

RELATED APPLICATIONS

This application is a continuation-in-part of U.S. patent application Ser. No. 15/335,057 filed Oct. 26, 2016, which claims the benefit of U.S. provisional application Ser. No. 62/399,093 filed Sep. 23, 2016.

FIELD OF THE INVENTION

The present invention relates to display systems, and especially to display systems with backlit display surfaces, and most particularly to spherical backlit systems for displaying out-the-window imagery to a user in a simulator.

BACKGROUND OF THE INVENTION

Simulators are used for training users in a variety of applications, as is well known in the art. Frequently, training in a simulator employs a simulator with a projection screen or dome screen onto which imagery is displayed for simulating the out-the-window (OTW) view in a simulated vehicle controlled by the trainee and moving in a virtual environment.

One of the most common methods of creating this surrounding OTW imagery may be seen in U.S. Pat. Nos. 9,188,850 B2 or 6,552,699 B2, in which a number of rear-projection or backlit panels are organized and supported in a dome or sphere structure, i.e., a generally spherical screen arrangement that surrounds a training station at which the user sits. Real-time OTW imagery is rendered and projected on these back projection panels using a number of high-definition projectors supported around the exterior of the spherical display structure.

Unfortunately, projectors of this type have a relatively high life cycle cost compared to other types of display. Specifically, the projectors require lamp replacements about every 1,500 hours, and in addition the optics of the projection systems may require replacement as frequently as every 20,000 hours. All this is workable, but it would be preferable if a longer service cycle were possible.

Furthermore, in the displays that employ flat facets, such as in the back projection screens of U.S. Pat. Nos. 9,188,850 B2 or 6,552,699 B2, the imagery is projected onto and viewed on planar surfaces. Some issues associated with binocular perspective viewing can cause operational problems when the trainee is viewing the OTW scenery on the screen and also using imagery or symbology on a helmet-mounted display, due to the difference in distance from the trainee's eyepoint to the center of the flat panel as compared to the distance to the screen at the edge of flat panel. This difference in distance can produce misalignment of the OTW imagery with imagery or symbology in the head-mounted display that is intended to be superimposed over objects such as aircraft, etc., in the external OTW view of the simulation environment.

Finally, use of projectors on back-lit screens in a simulation sphere or dome increases the size of the system markedly because proper projection of the OTW imagery onto a panel requires the projector to be placed at a certain distance from the panel. This can be somewhat ameliorated by the use of mirrors to fold the light path, but there is a loss of intensity of light in folding the path from the projector to the screen, as well as simply complicating optical issues associated with the folding of the light paths.

SUMMARY OF THE INVENTION

It is accordingly an object of the invention to provide a display apparatus that overcomes some or all of the deficiencies of the prior art.

According to an aspect of the invention, a display system comprises a screen having a concave surface positioned so as to be visible to a user of the system. The screen comprises a plurality of screen elements supported adjacent one another so as to form that surface. Each of the screen elements comprises a respective faceplate comprising optical fibers extending adjacent each other so as to transmit light therethrough between two opposing face surfaces. One of the face surfaces is a concave display image output surface, and the other of the face surfaces is a substantially planar image input surface. The screen elements also each comprise a respective image panel having a field of pixels each transmitting light corresponding to serial images of said panel. The fibers of the faceplate receive the light of the pixels of the image panel and together transmit the light from the image panel coherently to its image output surface so that the images of the panel are displayed on the image output surface.

The curved concave surface may be a spherical surface, or it may be a cylindrical surface, or potentially some other sort of curved surface appropriate to the given usage of the simulator.

According to another aspect of the invention, a component for a display system comprises a faceplate comprising a number of optical fibers secured therein. Each of the fibers has a first end supported in a planar surface of the faceplate and a second end opposite to the first end supported in a concave spherical surface of the faceplate. The first end is configured so as to receive light from an image engine associated with the faceplate, and the second end is configured so as to transmit the light from the first end in a diffused pattern. The faceplate has a symmetrical kite shape with two connected short edges and two long edges meeting at an angle. The short edges of the faceplate extend along respective geodesic portions of the concave spherical surface, and the faceplate has planar side walls extending normally away from the concave spherical surface. The angle and kite shape are such that the faceplate can be combined with a number of other faceplates so as to form a regular polygon having five or six peripheral sides of equal length.

Alternatively, the kite-shaped elements may be combined with quadrilateral shaped elements to form a number of pentagonal screen element arrangements that form the entirety of the screen of the display. Each pentagonal screen element has five kite-shaped elements forming an inner pentagon, and a peripheral pentagonal outer ring of elements defining the outer edge of the pentagonal segment, and in which there are kite-shaped screen elements and also asymmetrical quadrilateral screen elements combined.

Other objects and advantages of the invention will become apparent from the specification herein.

BRIEF DESCRIPTION OF THE DRAWINGS

FIG. 6A is a partial cross-sectional diagram of a screen system according to the invention taken through the design eye point of the dome.

FIG. 7 is an isometric detail view of a screen element showing the faceplate and the image panel behind it.

FIG. 8 is a diagram showing the distribution of the light as applied to and projected from the faceplates of the screen elements according to the invention.

FIG. 11 is a cross-sectional view taken through the long-axis center line A-A of FIG. 9.

FIG. 12 is an end view of the faceplate from line B-B of FIG. 9.

FIG. 15 a detailed cross-sectional view of the abutment and supportive joint between two adjacent faceplates of two polygonal structures of the dome.

DETAILED DESCRIPTION

Figure 1:
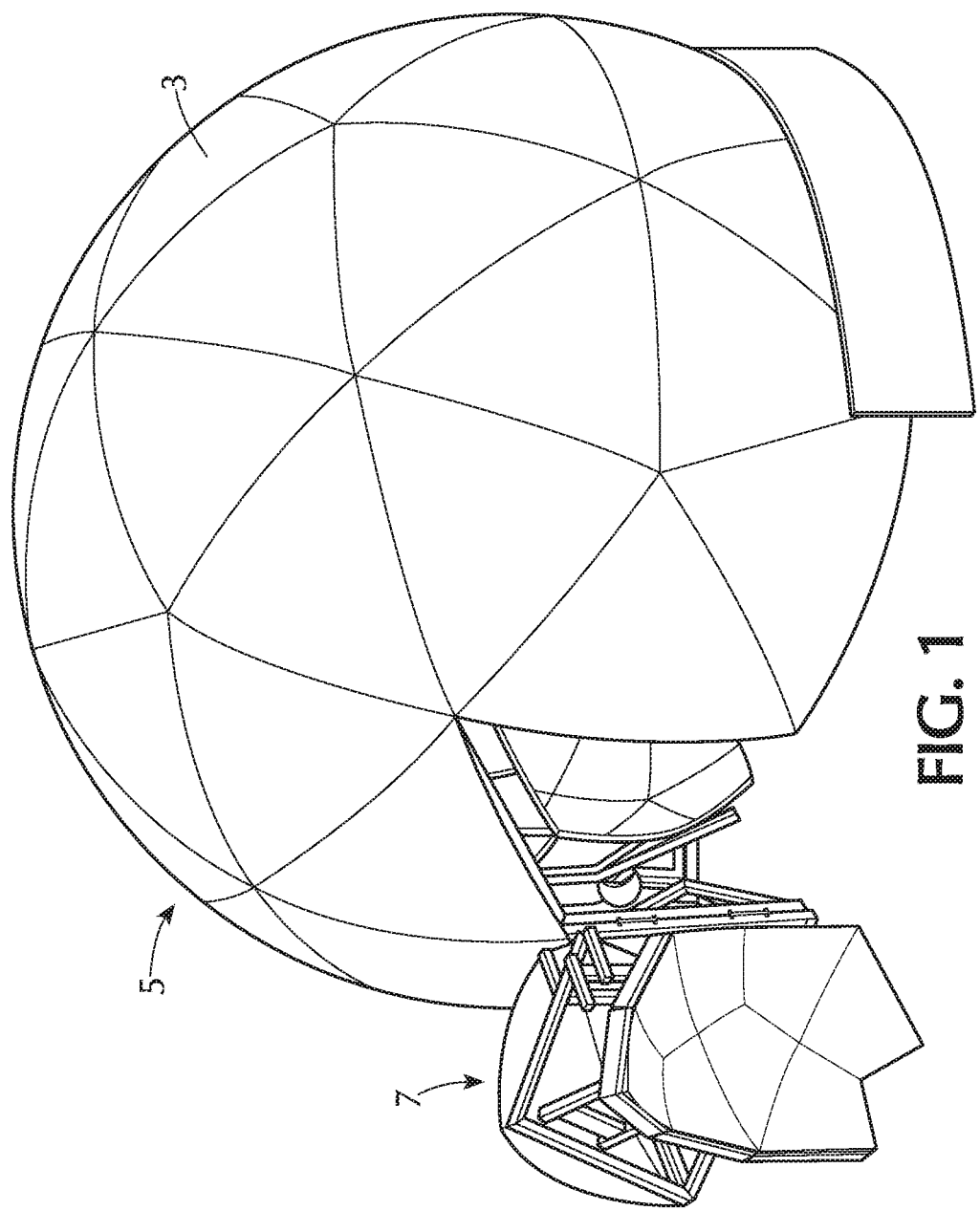
FIG. 1 is an isometric view of the external appearance of a spherical simulation system according to the invention.

Referring to FIG. 1, a simulator system 3 according to the invention is shown. The system includes an external enclosure or spherical housing that surrounds the entire simulator and is shown indicated at 5. The external housing 5 includes a door area indicated at 7 that can be rotated away to allow access to the interior of the simulator 3.

Figure 2:
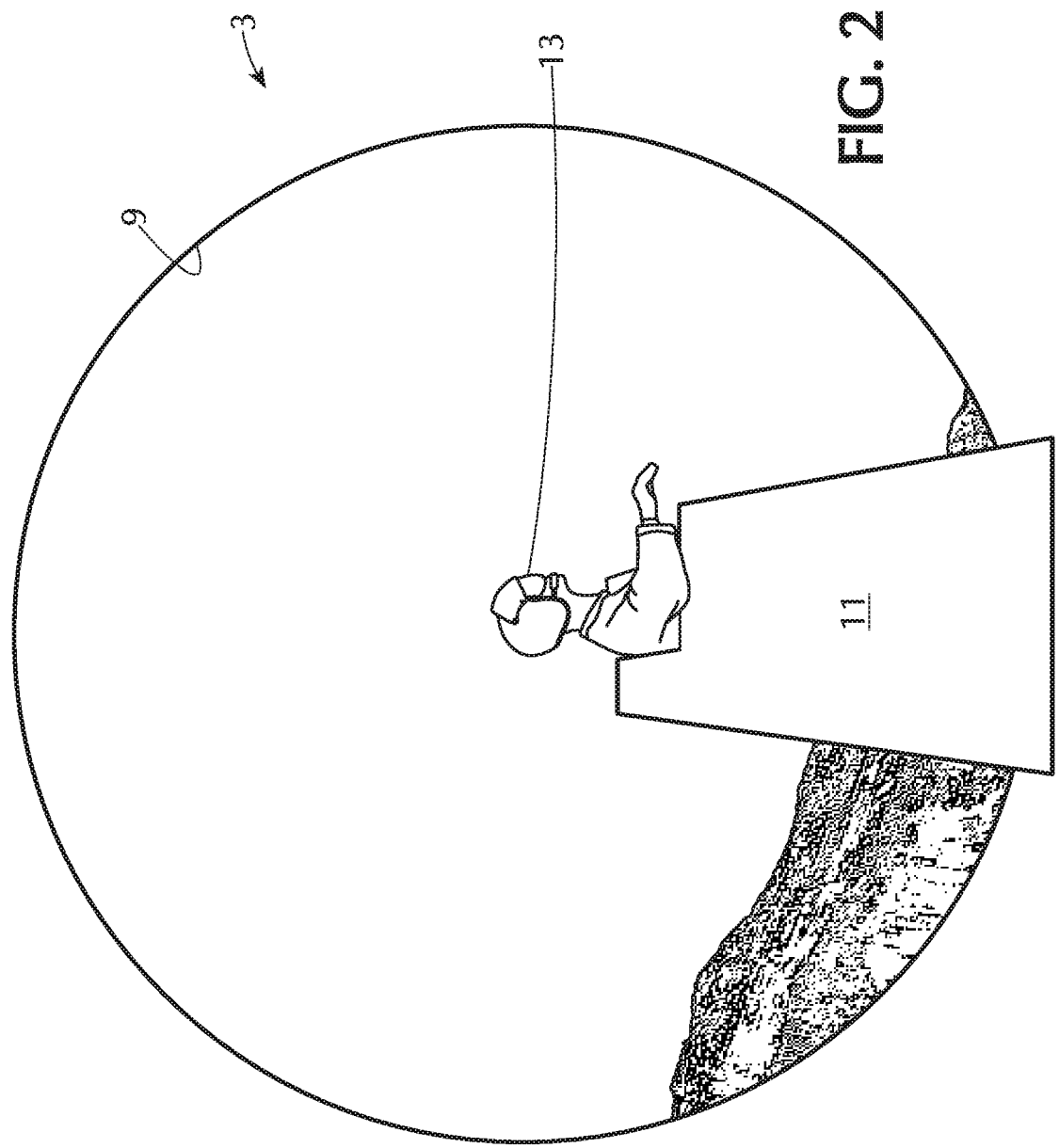
FIG. 2 is a diagram indicating the position of a human trainee in the system of FIG. 1.

Referring to FIG. 2, inside the simulator 3, a spherical screen surface 9 is provided that extends around a user station 11. The user position is normally a simulated cockpit or a simulated vehicle control area on which the trainee sits or stands. The user station 11 is configured such that the eye of the trainee is preferably close to the geometrical center 13 of the sphere in which the surface of screen 9 lies. The geometrical centerpoint of this sphere is referred to as the design eyepoint.

In the preferred embodiment, the distance from the central design eyepoint indicated at 13 to the surface 9 is approximately six feet. Depending on the circumstances, the distance may be less or more than this.

Figure 3:
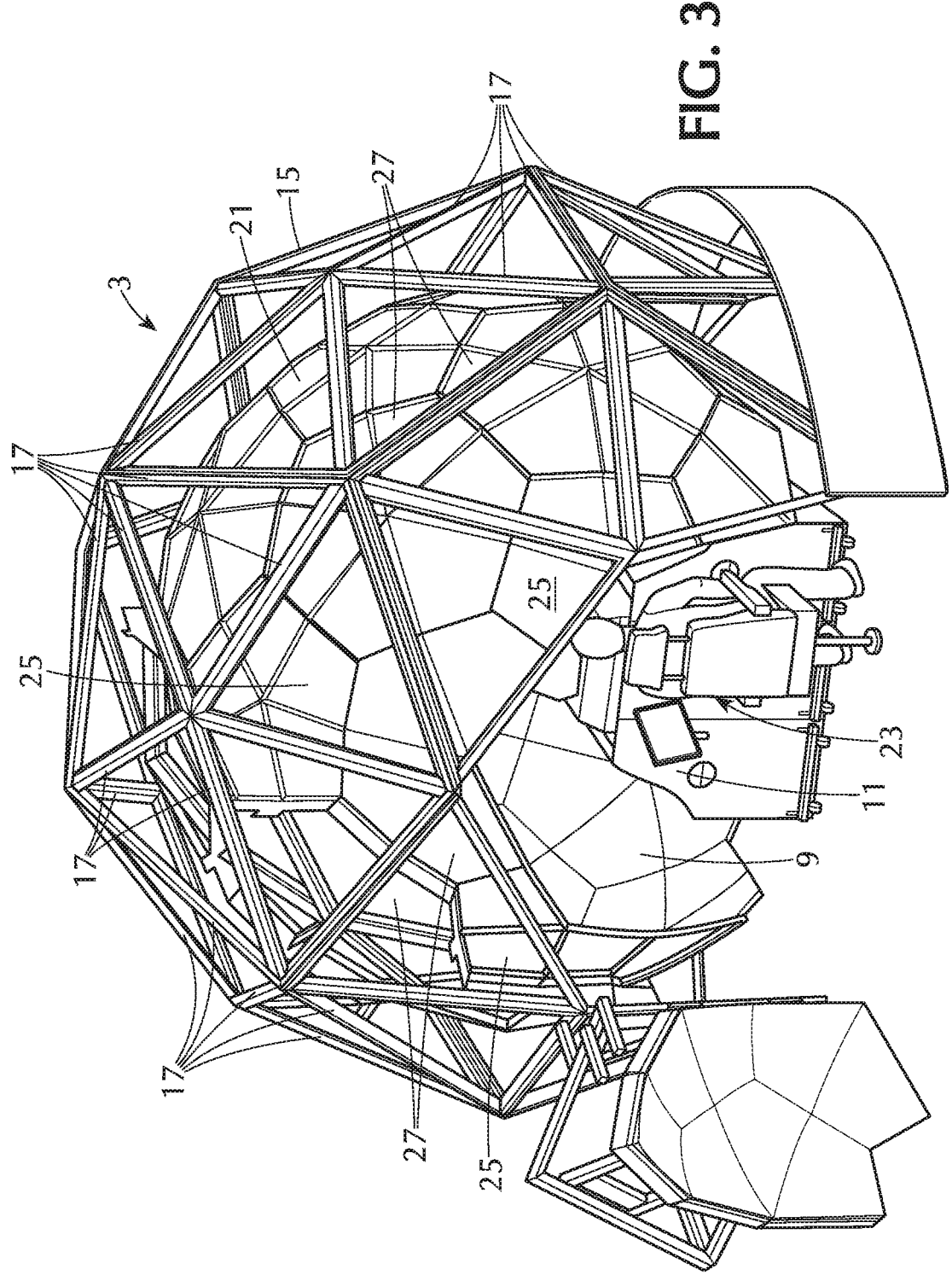
FIG. 3 is an image of the system as in FIG. 1, but with the external housing and other structure removed.
Figure 4:
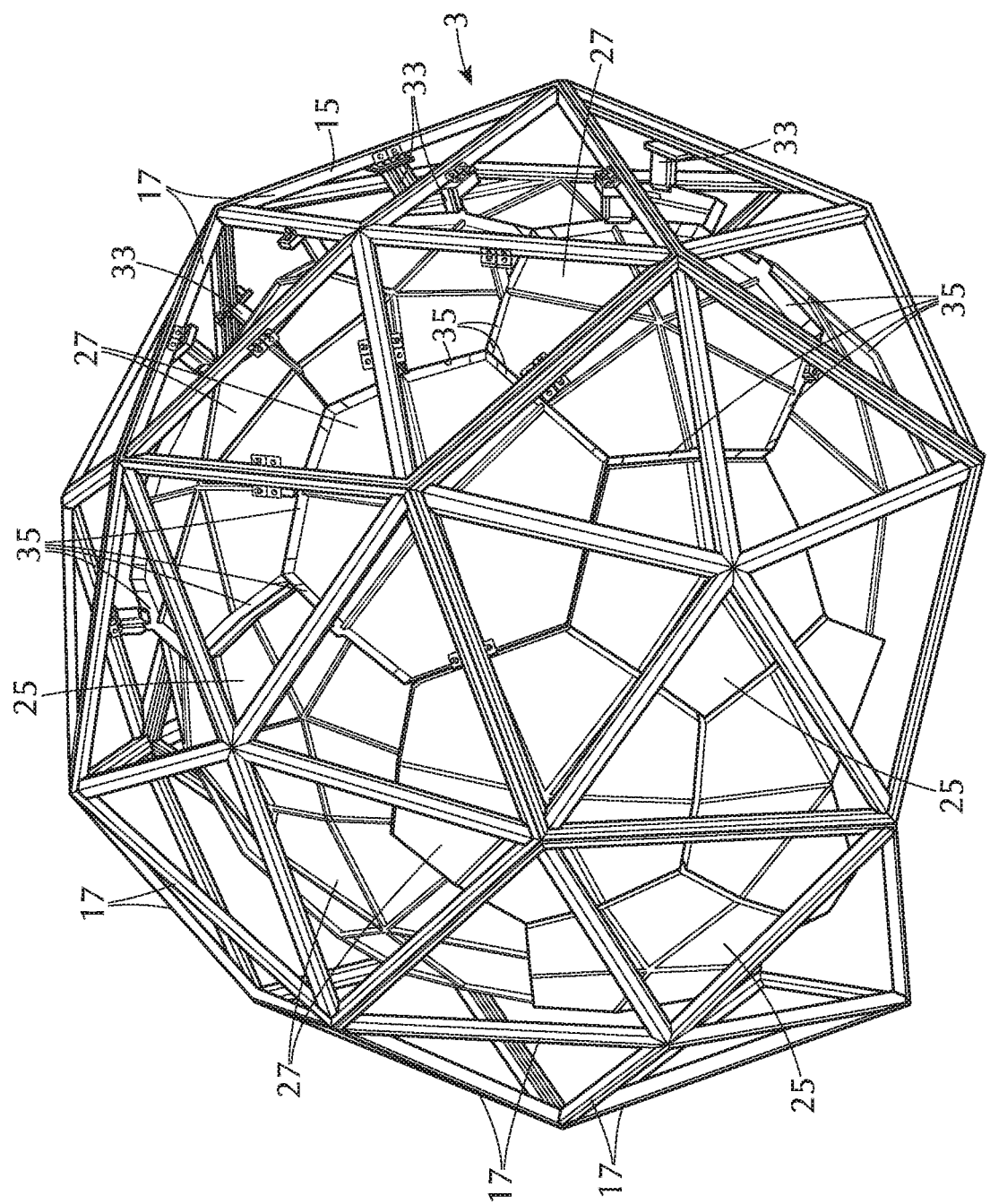
FIG. 4 is a view of the system of FIG. 1 with the outer covering of the external housing and other structure removed.

As best seen in FIGS. 3 and 4, underneath the external housing or covering 5, the system 3 has a structural frame 15 made up of a number of individual structural members 17 that are all affixed to each other in a pattern of triangle structures that resemble a geodesic dome structure that wraps around the outside of the interior spherical projection screen and supports the screen and the image displays that provide imagery to the screen. According to the usual design of a geodesic dome, each of the structural members of the spherical structure extends as a respective chord of a great circle of the sphere, i.e., an equator-sized circle. The structure 15 shown deviates slightly from a pure geodesic design, but the structural members 17 are nonetheless organized in triangular assemblies that together make up hexagonal and pentagonal arrangements in a generally spherical shape around the interior sphere 21 of the actual display. The screen sphere 21 is a spherical structure, but it is not a complete sphere in that it does not extend 360 degrees around in all directions. However, the screen sphere does provide 360 degrees about the user in horizontal view, and also extends above the trainee when sitting at the trainee station 11.

As shown in FIG. 3, the system 5 has a trainee cockpit seat at 11 as well as an instructor station indicated at 23 that allows an instructor to remain in the simulation during the training so as to assist or enhance the instruction.

Figure 5:
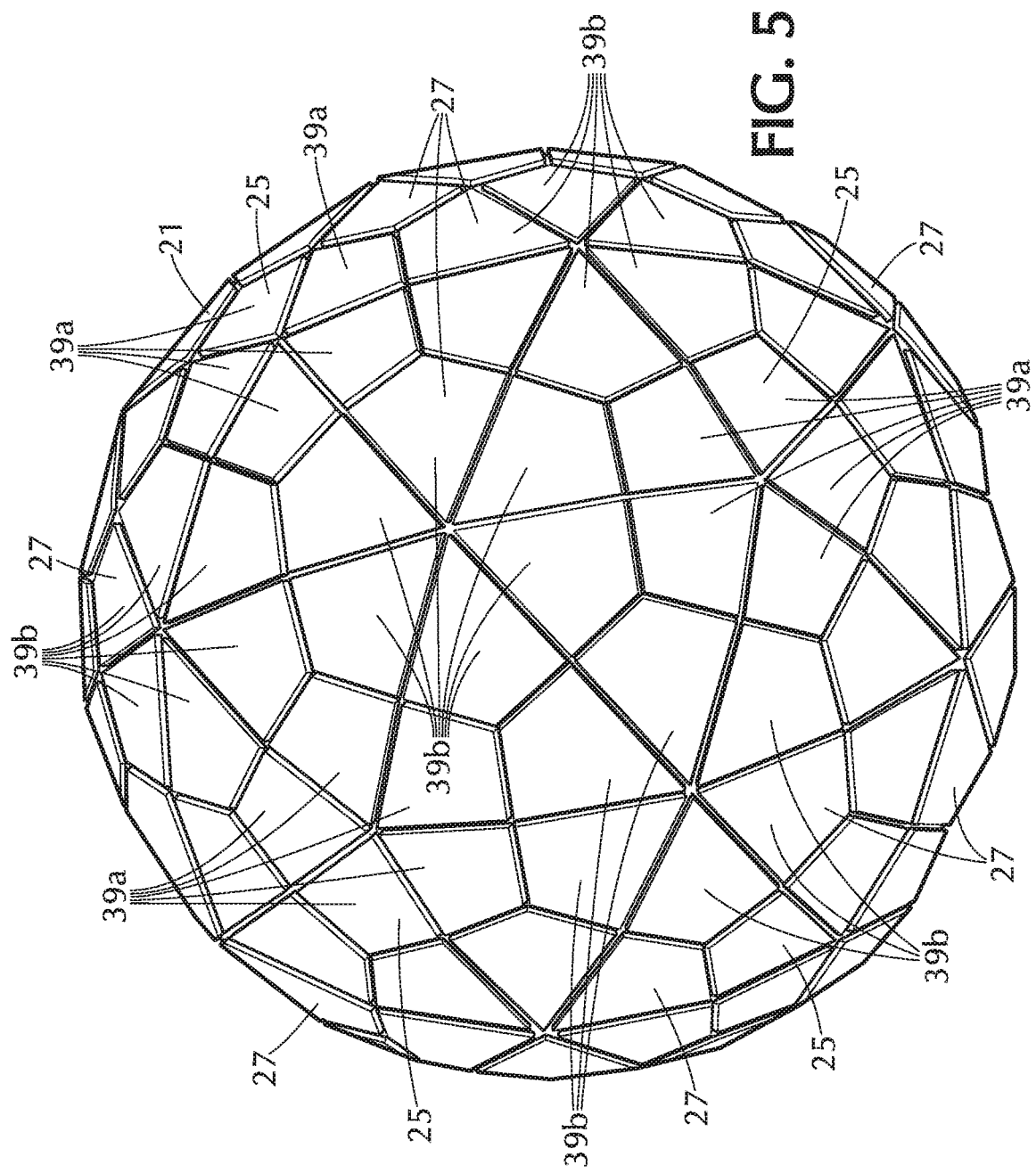
FIG. 5 is a diagram of the distribution of screen elements or faceplates in a spherical display system according to the invention.

FIG. 5 illustrates the tessellation of the screen sphere structure 21 into a number of discrete kite-shaped screen elements 39. The sphere structure 21 is first divided up into a collection of polygons, i.e., pentagonal structures 25 and hexagonal structures 27. The pattern of the hexagons and pentagons is typical of geodesic dome patterns, which are so named because the edges of each of the pentagons or hexagons extend along a geodesic of the sphere. As a general principle, this means that imagery on each of the polygons is the same resolution along their edges and along the surface of the polygon, which may be advantageous from an image generation standpoint.

Each polygonal structure 25 or 27 is then subdivided into five or six screen elements, each of which is a kite shape, i.e., a quadrilateral that is symmetrical across its longer axis. The screen elements are either screen elements 39a that make up a pentagonal structure 25 or screen elements 39b that make up the hexagonal structures 27. Screen elements 39a and 39b are slightly different in dimension relative to each other, but are in almost all respects identical otherwise.

For the pentagonal portions 25, each polygon is divided into five separate elements 39a, each of which is defined by the line from the center point of the side of the polygon to the center point of the polygon itself, with the result that the individual elements 39 of the hexagon are all deltoid or kite-shaped elements with the acute angle of the kite shape at the center of the pentagon being approximately seventy two degrees, or slightly less, due to the spherical shape of the structure. The symmetrical angles facing each other on opposing sides of the kite are approximately ninety degrees, or slightly less, to fit into the spherical surface.

Each of the hexagonal portions 27 is divided into six separate elements 39b, each of which is defined by a segmentation from the center point of the side of the polygon to the center of the polygon, with the result that the individual elements 39 of the hexagon are all kite shaped elements with the acute angle of the kite shape at the center of the polygon being approximately sixty degrees, or slightly less due to the spherical shape of the structure. The two symmetrical angles of the kite shape facing each other are also approximately ninety degrees, or slightly less.

FIG. 6A schematically shows the structure of a portion of the spherical screen 21. Inner concave spherical display surface 9 is made up of the constituent individual screen elements 39 that have surfaces that abut each other at planes X that are normal to the spherical surface 9.

Figure 6B:
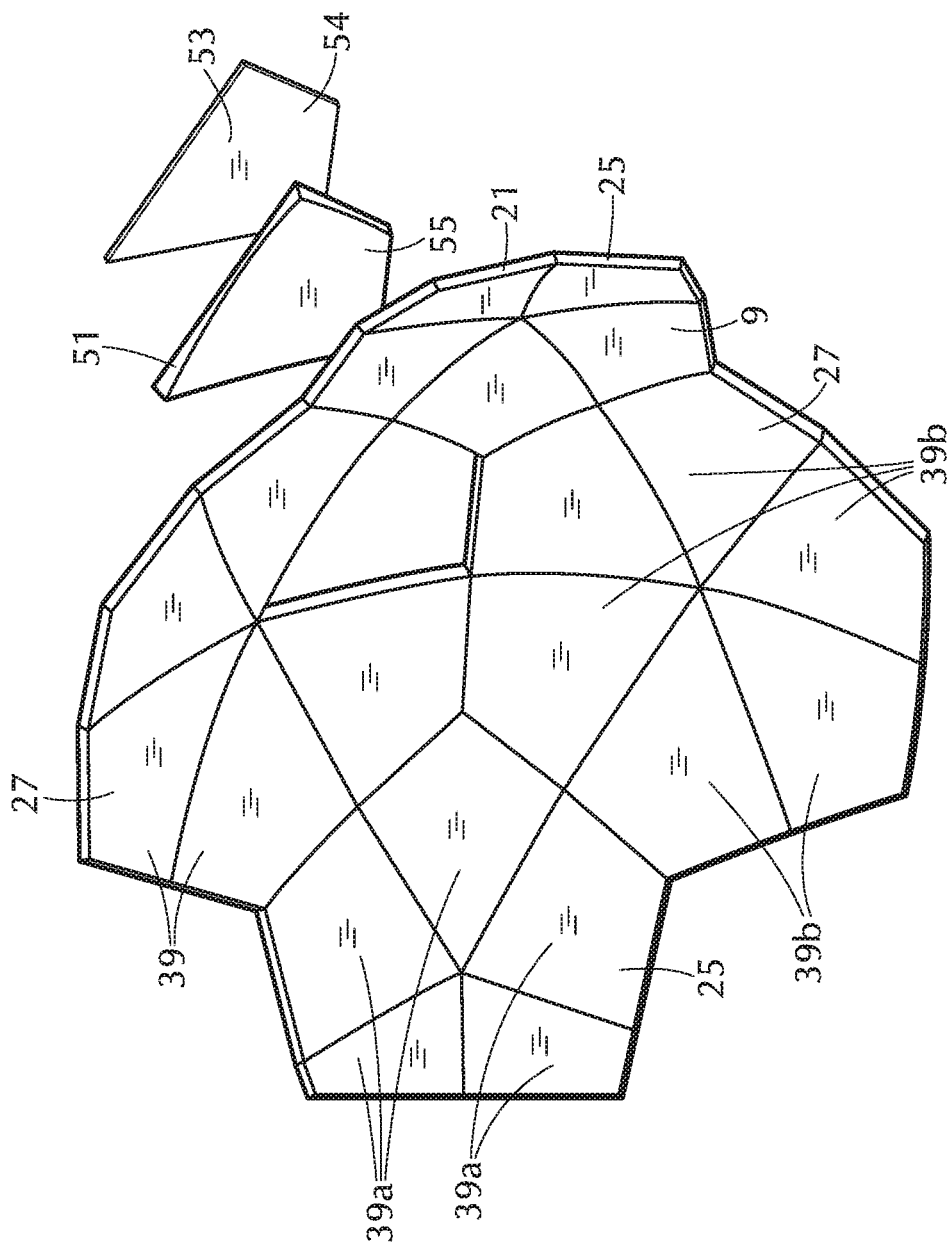
FIG. 6B is a partially exploded schematic view of one screen element of a display system according to the invention showing the faceplate and associated display panel of the screen element.

As shown schematically in FIGS. 6A and 6B, each of the screen elements 39, whether screen elements 39a from the pentagonal structures 25 or screen elements 39b from the hexagon 27 portions, is composed of an inwardly supported faceplate 51 and an outer corresponding light engine or image panel 53.

The inward concave surface 55 of the faceplate 51 is a portion of the interior concave spherical surface 9 of the sphere screen 21, and has an outer surface 83 (FIGS. 9, 10, 11 and 12) that is planar. Faceplate 51 is made of optical fiber material of coherently organized optical fibers, preferably of acrylic material. In the preferred embodiment, in the material of the faceplate, all of the fibers extend in parallel, and all of the fibers extend in a direction normal to the planar surface 83 of the faceplate 51 inwardly to end at the concave surface 55. In an alternative embodiment of the invention, the optical fibers may be organized so that they taper so as to grow narrower as they extend outward from the interior concave spherical surface 55, as will be discussed below.

The light engine or image panel 53 has a planar inward surface 54 that is also a kite-shape that is substantially equal in size and dimension to the outer planar surface 83 of the faceplate 51. The light engine or image panel surface 54 is effectively completely a matrix or field of color pixels that can be each illuminated as in a typical HDTV screen, except that the shape of the panel is a kite-shape rather than a rectangle. The panel may have a very narrow frame around the inward face pixel field 54, but that frame width is preferably very limited to ensure clearance around the panel 53 when the system is assembled. The pixels are organized in rows as in a normal TV screen, usually extending parallel to the long axis of the kite-shape.

The image panel 53 is preferably an LED (light-emitting-diode) type display, wherein each pixel generates its own respective light and color. Alternatively, the panel 53 maybe an LCD screen with an appropriate backlight in the housing of the panel 53, or an OLED (organic light-emitting-diode) display, or any analogous technology that produces light of an image at a forward surface of the display. For an LCD image panel, free-form LCD displays are particularly desirable because they allow for a housing that is approximately the same size as the image and provides sufficient clearance for the assembly of the display dome.

Additionally, even though flat panels are preferred, the invention herein may be employed using a projector as the light engine, with the projector projecting its output image onto the image panel surface 54 for the given faceplate.

Also, it is possible to use a light engine or image panel that produces only non-visible infra-red light imagery to allow a trainee to use night vision goggles in the simulator sphere in a dark-environment exercise.

The image panels 53 are all connected with an image generator, not shown but well known in the art, that generates the specific series of images that are displayed on the panels 53 to represent that portion of a virtual environment in which the simulation training is conducted. Light from the pixels of images displayed on the planar pixel field surface 54 of the panels 53 passes directly into the optical fibers of the faceplate 51 and proceeds to the inward surface 55 of faceplate 51 so as to be viewed by the user inside the sphere 21. The fibers in the faceplate are extremely thin, e.g., thinner than 100 microns, and much smaller than the pixels of the display panel 53, which have a size in the range of 0.1 to 1 mm, and preferably less than 0.5 mm but greater than 0.1 mm. As a result, the light from each pixel is carried by a number of discrete fibers that are aligned with the pixel. In the preferred embodiment, the faceplate material is of parallel fibers, the image proceeds coherently and rectilinearly to the inside surface 55 of the faceplate 51. The transmission of the light through parallel fibers in the faceplate 51 is substantially without distortion of the pixels of the image of image panel 53, although there is a slight distortion or variation in light intensity resulting from the transition from the planar surface 83 to the inwardly concave spherical surface 55. The output end surfaces of the parallel fibers, and as a result the transmitted pixels, at the midpoint of the faceplate 51 are slightly smaller compared to pixels transmitted at the edges, where the fiber end surfaces are cut an angle to meet the curvature of the inward surface 55 with the result that the output surface of the angled inward end of the fibers is stretched in the direction of curvature. The angle of the ends of the fibers and the stretched distorted surface area of the pixels increases as they are located away from the center of the faceplate 51.

The distortion may be reduced or overcome by tapering the fibers so that their inward ends are all slightly larger than the outward input ends, scaled so that the input is mapped by the fibers directly to the surface. Ideally, the inward ends of the fibers all have equal surface areas and dimensions, and the outward ends of the fibers all have the same surface areas and dimensions.

FIG. 7 shows the faceplate in greater detail. The inward faceplate 51 in each screen element 39 is supported adjacent the corresponding image panel 53 which has the same or a very similar matching kite shape and dimension. The faceplate 51 itself has a shape that allows it to be supported abutting all four sides adjacent the faceplates 51 of adjacent screen elements with abutment that is close enough that it ideally is not possible to detect a seam between pixels in their display through faceplate 51 and adjacent faceplates and with a continuous smooth inner spherical surface formed by the adjacent faceplates.

The planar image surface 54 of the image panel 53 abuts or is supported closely adjacent the outward planar surface 83 of the faceplate 51, and the perimeter of the faceplate 51 substantially matches the perimeter of the kite shaped display panel 53 so that the two parts align naturally. The faceplate preferably overlies the entire inward display pixel field 54 of the panel 53, although a slightly wider housing of the display panel 53 may be employed, provided clearance is possible within the support structures 35, as will be discussed below.

The faceplate 51 is also configured to be supported together with adjacent faceplates so as to provide a substantially seamless uninterrupted inward display surface of display sphere 21. To that end, faceplate 51 has a number of surfaces that accommodate the support and assembly of the faceplate as part of the spherical surface.

The inward surface 55 of the faceplate is a portion of the sphere with a uniform radius that is the same as all of the other screen elements in the system. This is a specially treated surface that provides for the display of images supplied at the outside of the face plate 51. The faceplate has outward side portions 57 and 59. Those portions 57 and 59 are planar and extend substantially perpendicularly to the planar face 83 of the faceplate 51. These portions 57 and 59 provide rectangular surfaces at the sides of the faceplate 51 that can be glued or bonded to support structures, as will be describe below, that support the faceplate in position in the sphere. In the preferred embodiment, these rectangular side faces 57 and 59 are about 1.26 inches wide and extend fully along the sides of the faceplate 51 so as to provide a suitably large surface for any physical connections or attachments needed.

In order to allow the assembly of the screen element 39 with adjacent screen elements into a seamless sphere display, the faceplate also has transitional bevels or sections cut into the sides of the faceplate 51 adjacent and inward of the inward edges of rectangular side portions 57 and 59. As best seen in FIGS. 11 and 12, on the polygonal perimeter portions of the faceplate 51, each side of the faceplate has bevels or section cutaways 61 and 63 at opposing ends of the sides of the faceplate. Due to the curvature, these cutaways narrow down to zero width in the middle of the edge, where they meet. These are geometrically cutaways in a plane extending normal to the curved surface 55. Similar cuts or bevels 65 and 67 are made in the other side walls 59.

The bevels or cutaways 61, 63, 65 and 67 allow the assembly of the faceplates together at a slight angle of the planar faces 83 thereof to each other, but with the curved surfaces 55 of adjacent faceplates extending continuously and without any seams or discontinuity into a spherical interior screen surface 21.

Referring to FIG. 8, the general light processing of the faceplate 51 is schematically illustrated. The faceplate 51, as set out above, is made up of a large number of optical fibers that are relatively small and extend parallel to each other in a coherent way so that an image applied to the input side proceeds substantially without any distortion to the concave display surface side 55 as is shown by exemplary fiber optic path 69. When light from a display pixel is applied at the entry point 71 of the light path 69, the light enters freely into the fiber optic from all directions. The light then proceeds through the fiber optic along path 69, or along one of the thousands of other fiber optic paths parallel to it in the faceplate 51, to an inward end point indicated at 73 in the backlit inner surface 55, which is part of the spherical display surface 9 (FIG. 2).

The inward end of the fiber optic material, i.e., the inward end of all the optical fibers, is preferably treated so as to be light diffusive, most commonly by being coated with a coating of material that creates an omnidirectional or general Lambertian distribution of light that arrives at this point 73. As a result, this point of light in the display can be seen from virtually anywhere within the spherical display dome.

The fiber optic material used is narrow, i.e., in the range of fifty to one hundred microns in diameter, and preferably about seventy microns in diameter, and the optical fibers are bundled and fused in the material so that all of the optical fibers extend essentially parallel to each other and transmit the light and imagery coherently without altering its position in the overall image from the panel 53 in any way. Although the optical fibers are preferably of acrylic material, other material such as glass or quartz glass may also be used for the faceplate 51 if it is desired. This type of optical fiber material is well-known in the art of wave guides and can be readily obtained as an off-the-shelf item.

Figure 9:
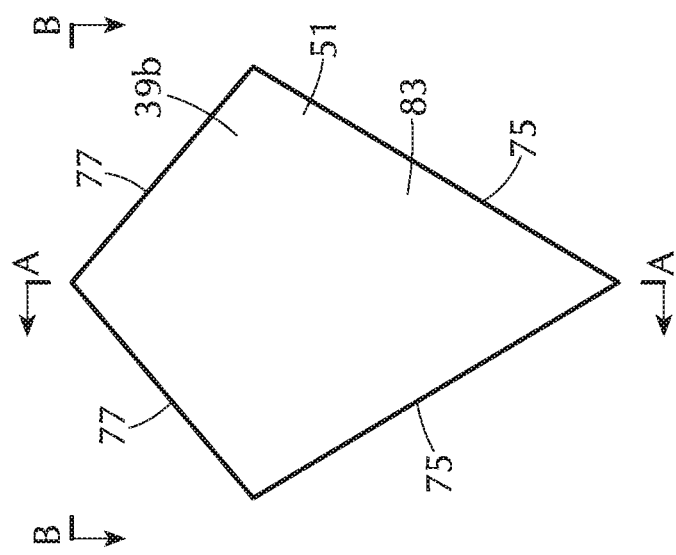
FIG. 9 is a view of the outer planar side of the kite shaped faceplate of the screen element in a pentagonal portion of a display sphere according to the invention.

Referring to FIG. 9, the planar surface 83 of a faceplate 51 of a screen element 39a for the pentagonal spherical portions 25 is shown. The kite shape of the element 39a has two long legs 75 that in the preferred embodiment are 20.905 inches in length, and two short legs 77 that are each 14.751 inches in length. This shape is appropriate for assembly with five elements into a pentagon with a spherical inward surface. It will be understood that when the faceplates are so assembled, the spherical inner surfaces are smooth and continuous between the faceplates, but the planar outer surfaces of the faceplates are angled slightly relative to one another, so that from the outside, the outer planar surfaces of the faceplates are not coplanar, but rather make something like a shallow five sided pyramidal shape. That angulation relative to each other is necessary for the inward surfaces of the faceplates 51 to align with each other and all lie in the same sphere centered at the design eyepoint.

Figure 10:
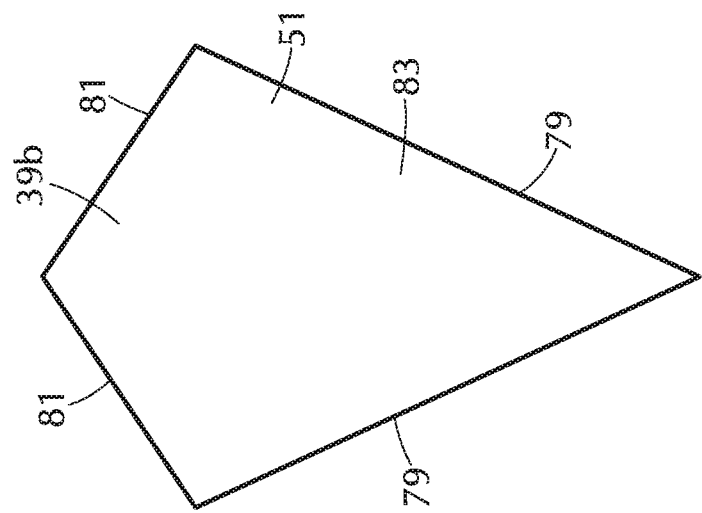
FIG. 10 is a view of the outer planar side of the kite shaped faceplate of the screen element in a hexagonal portion of a display sphere according to the invention.

FIG. 10 shows the outer planar surface 83 and the kite shape for faceplates 51 for the screen elements 39b that make up the hexagonal portions of the display sphere. The long sides 79 of this kite shape have lengths of 26.642 inches and the short sides 81 have lengths of 14.787 inches. As with the faceplates for elements 39a, these faceplates 51 when assembled form a uniform continuous inner spherical surface, but from the outside, the planar surfaces 83 for a sort of very flat hexagonal pyramid of sorts.

FIG. 11 shows the faceplate 51 is shown in cross section through the long center line of the kite shape. It will be understood that the appearance and cross sectional view is similar for both the pentagonal and hexagonal screen elements 39a and 39b. As is suggested by the cross hatching, the fiber optics extend perpendicularly from or normal to the rear face 83 of the face plate to the front spherical surface 55. As discussed previously, the cutaways or bevels 61 and 67 from the side wall are made to allow the assembly of the faceplates into a unified spherical screen. These cutaways however do cut off some of the optical fibers, generally indicated at 86, at the edge of the faceplate, so that the some of the optical fibers of the faceplate do not extend through to the inner display surface 55, but only to the bevel surface 67 or 61, which means that any pixels associated with these fibers would not be visible. Accordingly, the imagery displayed on the associated panel 53 is adjusted to accommodate this small number of optical fibers that are not employed or do not extend all the way through to the display surface 55.

It will also be understood that the curvature of the inward surface 55 might impart a slight distortion relative to the image at the surface 83 at the more curved portions of the faceplate near the edges. The image generator preferably provides the image output from panel 53 with a predetermined counter-distortion that constitutes a slight adjustment in its imagery to compensate for this to avoid any deviation from a completely accurate rectilinear view of a rendered environment shown on the surface 55 of the faceplate 51.

The kite shape image display used in the invention is provided as a custom made product. The displays themselves are preferably a small pitch LED technology or OLED technology displays of custom shapes. Suitable displays may be obtained from manufacturers such as Barco Inc. in Duluth, Ga. (www.barco.com), NEC Display Solution of Tokyo, Japan (http://www.nec-display.com), Planar Systems, Inc. (Leyard Optoelectronic Co., Ltd.) of Beaverton, Oreg. (www.planar.com), and SiliconCore Technology, Inc. of Milpitas, Calif. (www.silicon-core.com).

Instead of LED displays, LCD display technology with an appropriate backlight may also be employed. Particularly desirable for the present invention are free-form LCD panels, which may be manufactured in appropriate kite shapes. One source of such displays is Sharp Electronics of Tokyo, Japan. The material used to manufacture the panels is ideally IGZO (indium gallium zinc oxide) which is particularly desirable as it allows for driving the electronics inside the display, allowing for the LCD panel to be manufactured in the kite shape.

The number of pixels on such displays 53 is preferably at least 1.2 million or more. The arrangement of pixels is such that preferably on the long axis of the kites there are at least 1,000 pixels from one end to the other over the long axis. The ordering of rows or columns is not especially an issue, as the image generator can adapt to any type of digital display.

The method of manufacturing such small pitch LED screens is usually by formation of a combination of a large number of display screen sub-elements. These sub-elements generally have an aspect of, for example, 16:9 common to HD screens, and can be assembled into a screen of any configuration, especially one that can be made from a number of rectangles or triangular portions of those rectangles.

Figure 17:
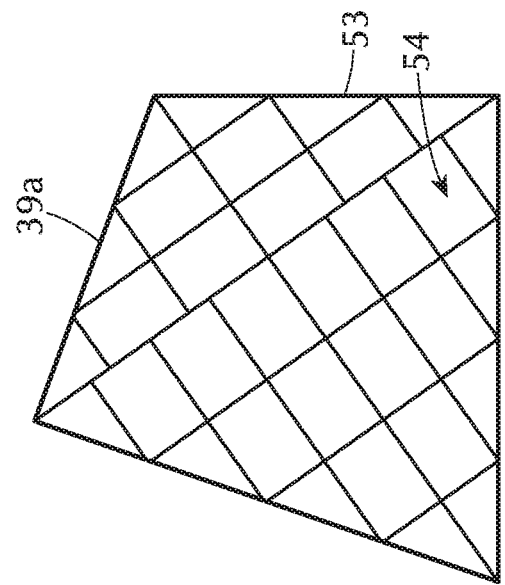
FIG. 17 shows an alternate configuration of screen sub-elements for a pentagonal display-image panel.
Figure 16:
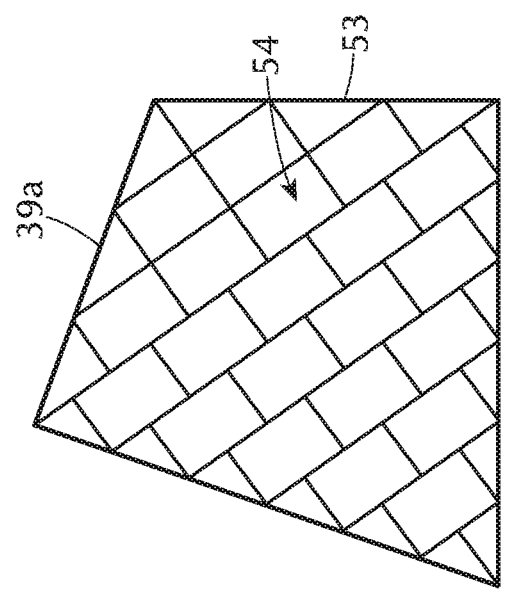
FIG. 16 shows a configuration of subsidiary pixel-display screen sub-elements for the pixel field of the display image panel of one of the pentagonal screen elements.
Figure 18:
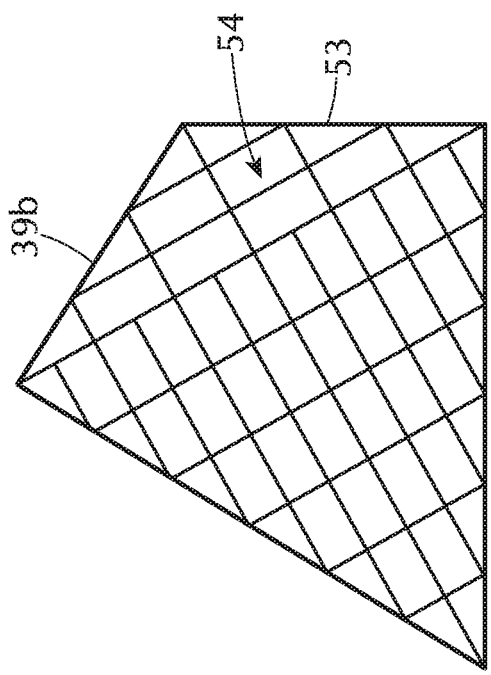
FIG. 18 shows a configuration of subsidiary pixel-display screen sub-elements for a screen element in the hexagonal portion of the dome.
Figure 19:
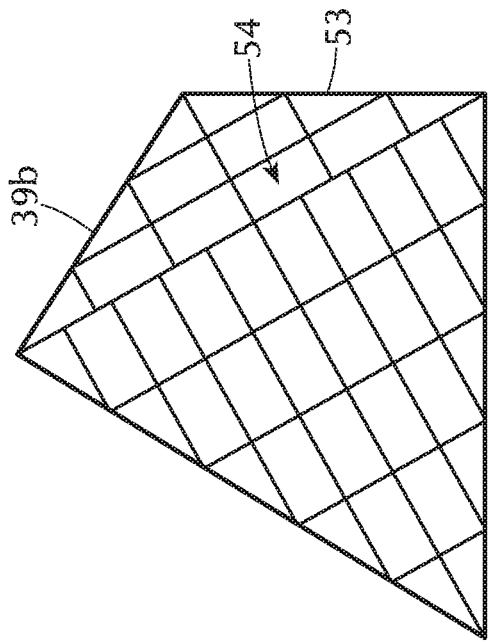
FIG. 19 shows an alternate configuration of screen sub-elements for a screen element from the hexagonal portion of the dome.

FIG. 16 shows an arrangement of efficiently distributed sub-screen elements that may be employed for a pentagonal-screen-element 39a image display panel 53. This arrangement efficiently uses a number of small panel sub-elements with triangular segments among them. Alternatively, another pattern of these sub-elements that might be used is shown in FIG. 17. For the hexagonal screen-element 39b image panels 53, FIGS. 18 and 19 also show arrangements of panel sub-elements that may be used.

The supporting structure for the interior sphere 21 of the screen elements is shown in FIG. 4. The outward structural sphere or geodesic structure 15 has triangular structural assemblies each made up of three support beams 17 that are assembled in a generally geodesic-dome configuration with modified pentagons and hexagons. The support beams 17 of exterior structure 15 have support connections 33 that extend inwardly of the outer structure and connect to and support polygonal frames or support structures 35 inside the outer structure. The support structures 35 in turn support the screen elements 39 that form the spherical projection screen 21. It should be understood that only some of the support connections 33 are shown, and not all of the image panels 53 are shown in FIG. 4, but some have been removed to better show the structure of the device. Virtually every beam 17 of the outer structure has a connecting structure 33 connected with a wall 85 of one of the polygonal support structures 35, and the exposed faceplates 51 in FIG. 4 in operation are covered by associated kite-shaped image panels 53 (not shown).

The polygonal support structures 35 are configured to support either pentagonal groups 25 or hexagonal groups 27 of screen elements 39, each of which supports, respectively, five or six constituent kite-shaped screen elements 39. The support structures 35 each comprises a set of five or six peripheral support plates or walls 85 that are welded together in the appropriate polygonal shape and each extends radially outwardly from the spherical screen 21 and form the perimeter of the respective pentagon or hexagon, and five or six walls 87 welded to each other at the center of the polygon and extending radially outward of the respective polygon. At the perimeter of the polygon, the walls 87 are each welded or bonded to a midpoint portion of a respective perimeter wall or support plate 85. The walls 85 and 87 together make up a wheel-like frame 35 that supports the screen elements 39. The perimeter walls 85 each have outwardly extending tabs 86 that project radially outwardly from the walls 85 and are secured by spot welding or otherwise to the connecting structures 33 (seen in FIG. 4) on members 17 of the support structure 15, resulting in the polygonal support structures 35 being supported inward of the outer support structure 15.

Figure 13:
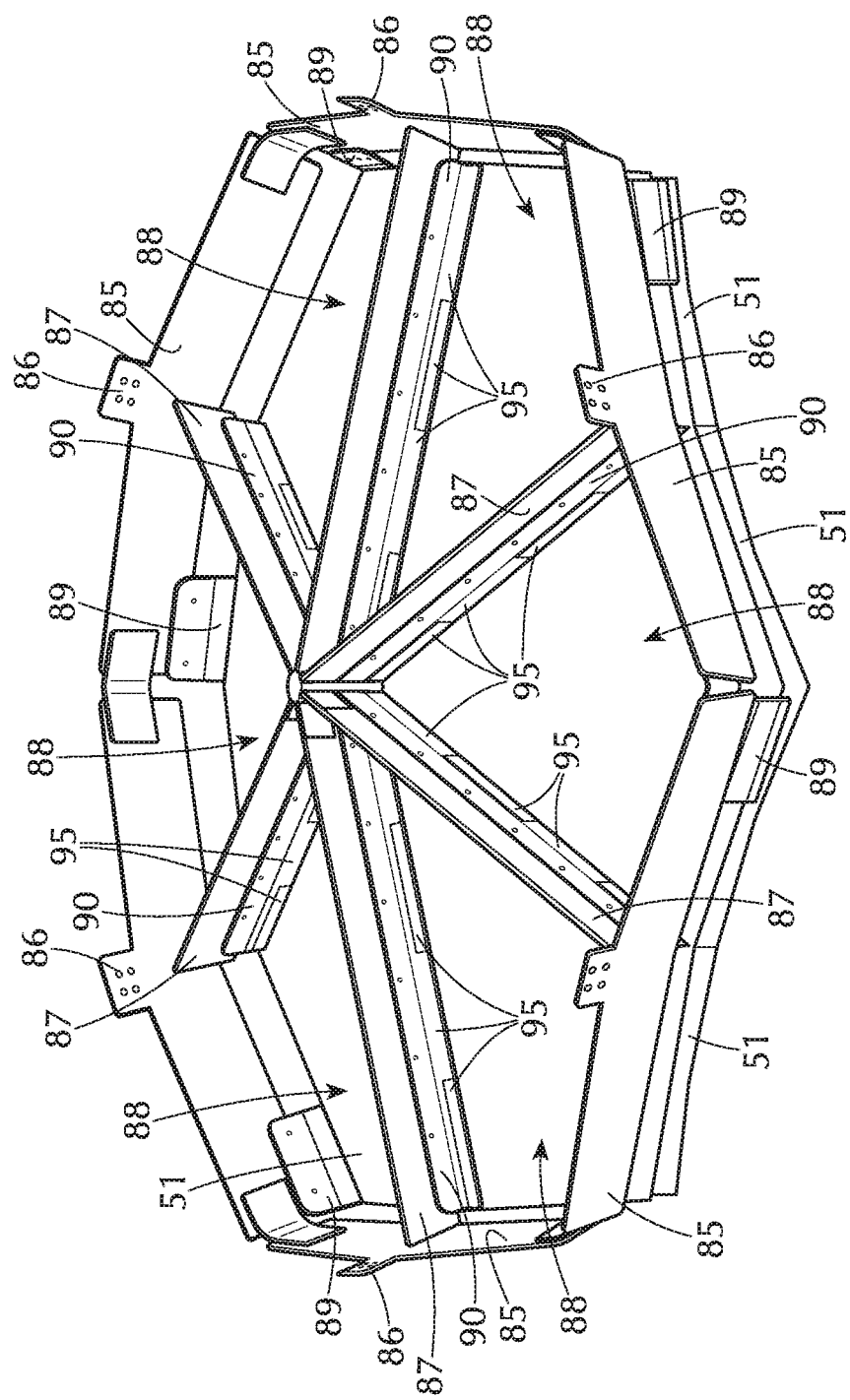
FIG. 13 shows the support structure of a hexagonal portion of the projection sphere system supporting six faceplates thereon.

Referring to FIG. 13, a polygonal support structure 35 for supporting the six faceplates 51 of a hexagonal portion 27 is shown. It will be understood that a similar structure is employed with a pentagonal support structure 35 as seen in FIG. 4. Walls 85 and 87 all lie in a plane extending through the center of the design eye point and therefore flare or are spread slightly outwardly from each other surrounding the polygonal interior of the structure 35, which is divided up into six generally kite-shaped volumes 88 in the support structure 35.

In order to support the faceplates 51, the members 85 and 87 of the frame 35 are provided with radially inwardly extending connection brackets 89, which are spot welded to inside surfaces of the perimeter walls 85 and extend inwardly of the screen sphere. The faceplates 51 are bonded to brackets 89 by their outer side surfaces 57 using an adhesive or other material that securely affixes acrylic fibers to metal so as to firmly support the faceplates in their spherical arrangement.

Figure 14:
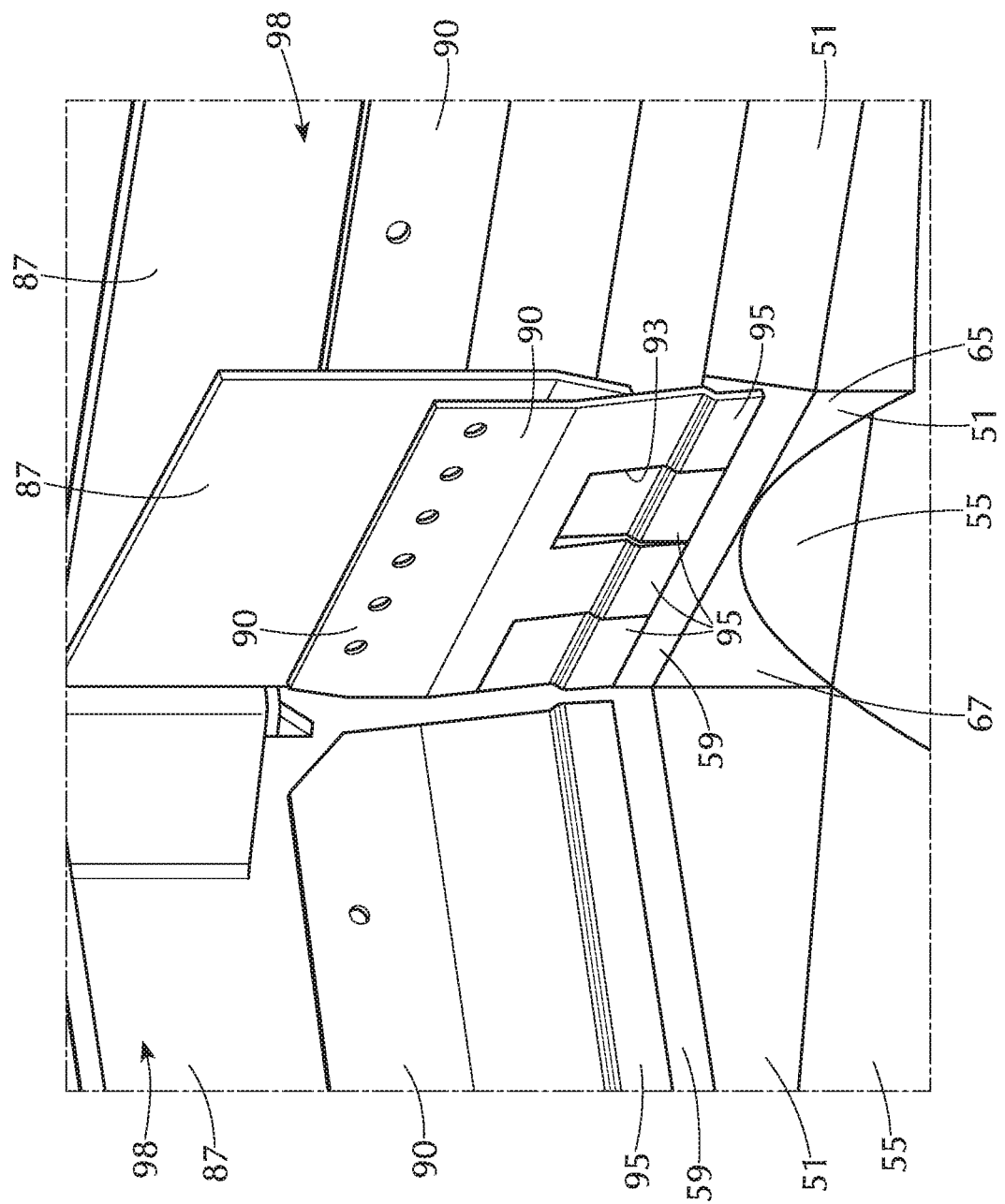
FIG. 14 is a detail view of the connection of the individual ribs of the support structure of FIG. 13 to the faceplates.

The connection of the other connected walls 87 to the faceplates 51 is shown in FIG. 14, which is a detail view in which one faceplate 51 is removed to show its supportive structure. Two connection plates or brackets 90 are spot welded to respective sides of each wall 87 and extend radially inwardly from it. Beyond the wall, the connection plates have inward extending tongues 93 on each side that define recesses between them through which the tongues 93 of the other connection plate 89 extend in an interleaved fashion. Inward of the lower edge 91 of wall 87, the brackets 89 are angulated slightly inward and they are provide slightly angled tab end portions 95 that lie flat against the side wall 59 of the associated faceplate, to which they are secured by bonding or glue or adhesive, supporting the faceplates 51 in the support structure 35.

Due to the angular meeting of the side walls 59 of faceplates 51 when cutaway faces 67 abut each other, clearance is provided between the side walls 57 so that the housing of the image panels 53 that are applied or support adjacent to the faceplates 51 can fit into the respective space 98. The image panels 53 are supported on structure, not shown, that is appropriate for support of video panels, as is well known in the art of supporting video displays. That panel supporting structure may tie into the polygonal frame 35, or it may connect directly to the structural beams 17.

FIG. 15 shows a cross-section of the structural meeting of the support structures 35 of two adjacent polygons. Walls 85 of each of the polygon support structures 35 abut each other at a plane that extends radially inward through the design eye point. The walls 85 are angled relative to the faceplates 51 so that the bevel surfaces 63 and abut each other, and so that the curvature of surfaces 55 of the faceplates 51 meet at a smooth continuous joint so as to form the spherical display screen 21. Connection plates each have angled portions that engage with and are bonded to the respective faceplate 51.

Figure 20:
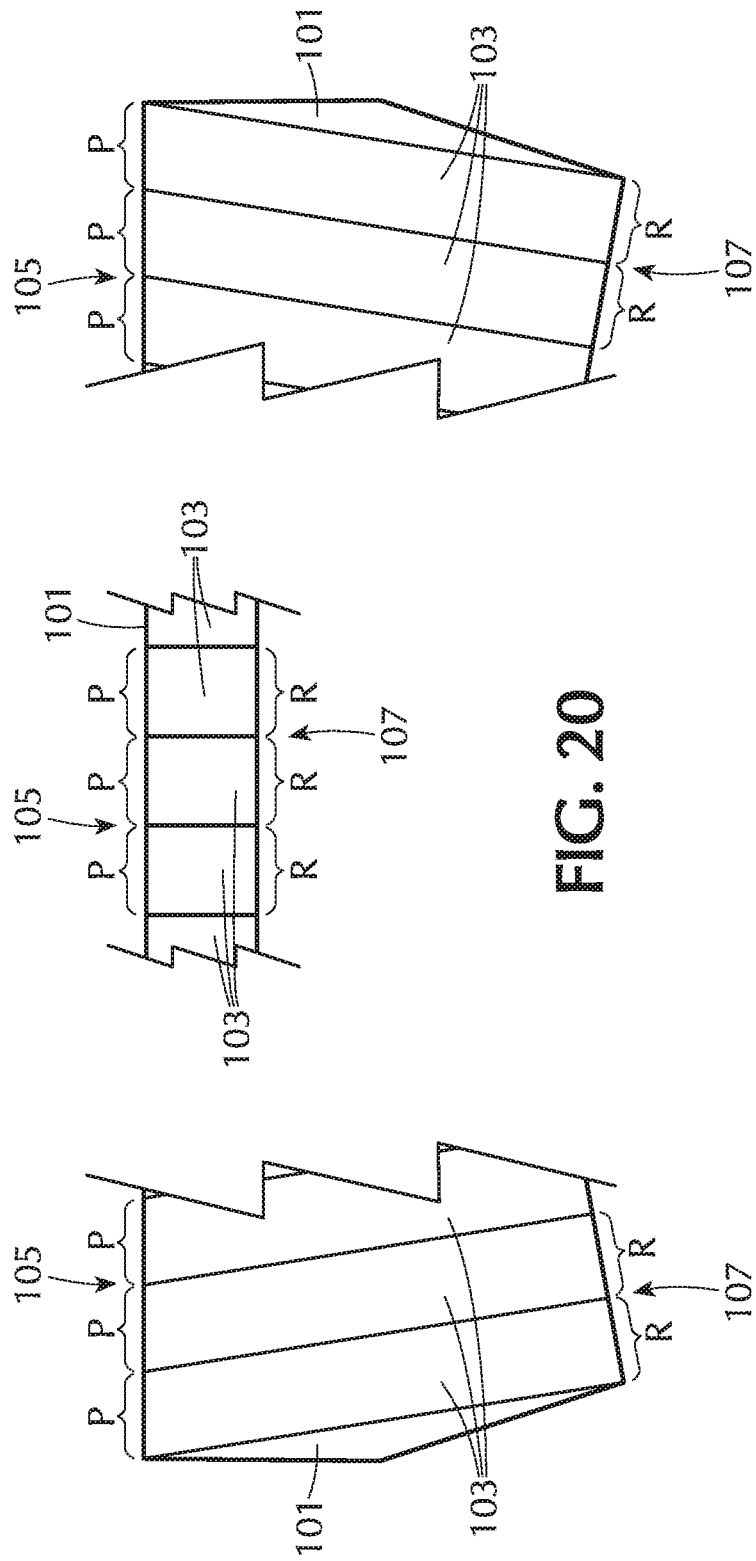
FIG. 20 is a cross-sectional diagram of an alternate embodiment of faceplate in which the optical fibers taper to eliminate distortion or intensity variation in the imagery translated from the flat panel image source to the spherical concave inner surface.
Figure 22:
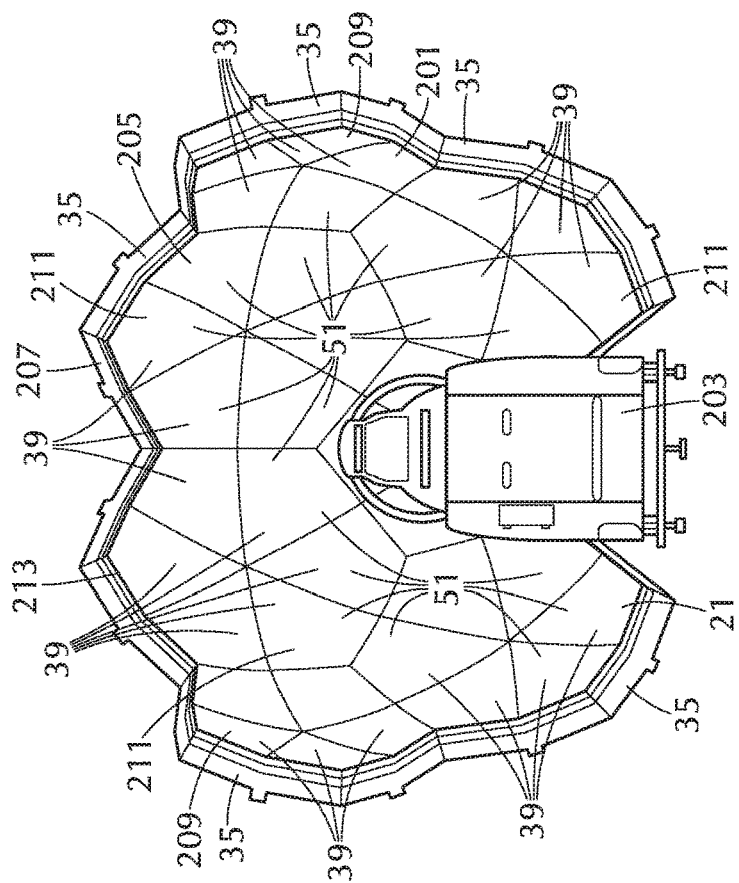
FIG. 22 is a rear view of the simulator of FIG. 21.
Figure 21:
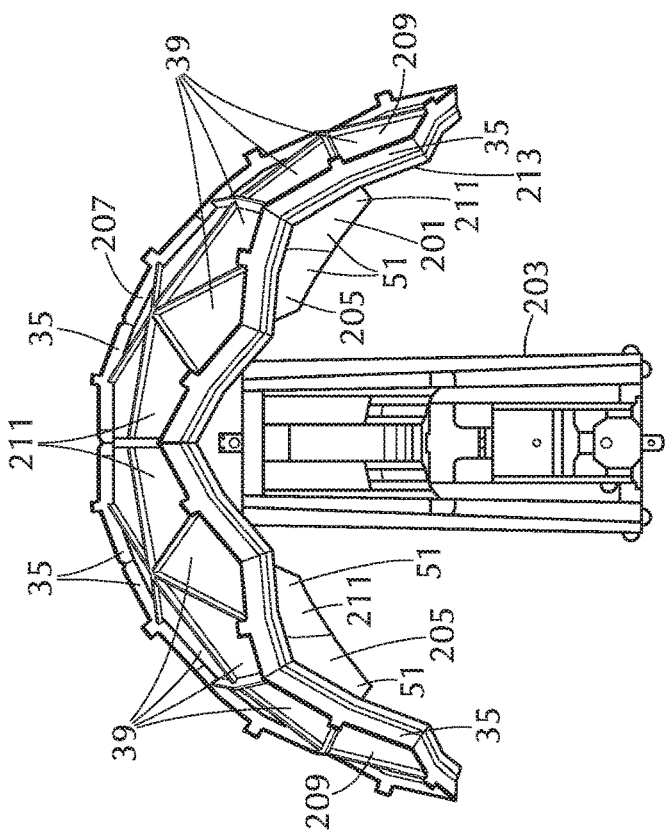
FIG. 21 is a plan view of a simulator employing an alternate embodiment of display system according to the invention.

FIG. 20 shows detail views of an alternate embodiment of faceplate. In the alternate embodiment, faceplate 101 is formed of a plurality of optical fibers 103 extending from an input face 105 to a diffused output surface 107, which is configured like that of surface 55 of the previously described faceplate 51. Output surface 107 is a spherically curved surface as in the previous embodiment, and the faceplate 101 is the same as faceplate 51 except for the tapering of its fibers 103. The fibers 103 of faceplate 101 are not parallel, but are tapered so as to eliminate distortion or variation of intensity of transmitted light at the output side 107 from the image display providing images to the planar input side 103. The tapering of the fibers 103 are such that there is a one-to-one map of the input image to the transmitted image.

This is accomplished by making the dimension P of the input ends of the fibers 103 in the plane all equal, and making the dimension R of the output ends of fibers 103 measured along the curved surface of output side 107 of the faceplate 101. The diagram of FIG. 20 shows the view through a cross section of the faceplate 101 in one dimension, but the same equality of dimensions applies to any cross section of the kite shaped faceplate, e.g., whether on the long or the short axis of the kite-shaped faceplate 101. In other words, the areas of the input ends of all of the fibers are equal in the plane of the input face of the faceplate, and the output areas of the curved-surface ends of all of the fibers, measured in terms of curved surface area, are equal.

The embodiment above is particularly useful for simulators for vehicles with a large, almost complete field of view, such as a fighter aircraft with a transparent canopy. However, some simulators are used for vehicles or environments where the field of view is not so extensive, such as a truck or a civilian commercial aircraft. Those simulators may also benefit from advantages of the invention by using a display screen that is a subset of the tessellated screen system described above.

An example of such a simulator 201 is shown in FIGS. 21 to 24. Simulator 201 has a trainee or driver station 203 that accommodates the trainee seated so as to face the concave spherical surface 205 of the screen structure 207.

Screen structure 207 is made up of a number of polygonal components, i.e., pentagonal subparts 209 and hexagonal subparts 211 that together provide the continuous spherical concave display surface 205, which is a portion of a spherical surface having a centerpoint at a design eye point calculated for a person in the trainee station 203.

Each of the subparts 209 and 211 is made up of either five or six kite-shaped screen elements 39 that are identical to the kite-shaped screen elements 39 of the previously-described embodiment. Each screen element has a fiber-optic faceplate 51 dimensioned for assembly into either a pentagon or a hexagon, as described above, in which the sides of the polygon extend along geodesic circles of the sphere of the spherical screen 205.

As with the previous embodiment, each faceplate 51 has an inward concave spherical display surface 55 that mates smoothly with the adjacent faceplate surfaces 55 to form a the spherical inner screen surface 205. Each faceplate 51 also has an outward preferably planar input surface mating with a respective complementary LED or LCD image engine or projector, not shown.

The faceplates 51 are supported on hexagonal or pentagonal support frames 35 like those of the previous embodiment. Those frames 35 in turn are supported on an external supporting frame similar to that of the previous embodiment, except that it extends only around the outer portion of the screen structure 207.

Figure 24:
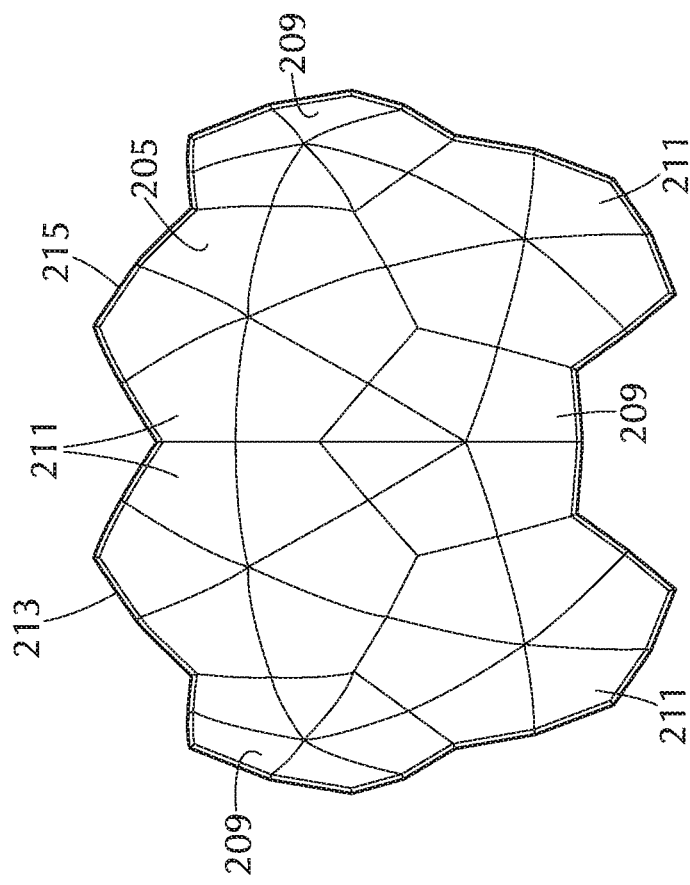
FIG. 24 is a forward-looking view of the display screen structure of the simulator of FIGS. 21 to 23.
Figure 23:
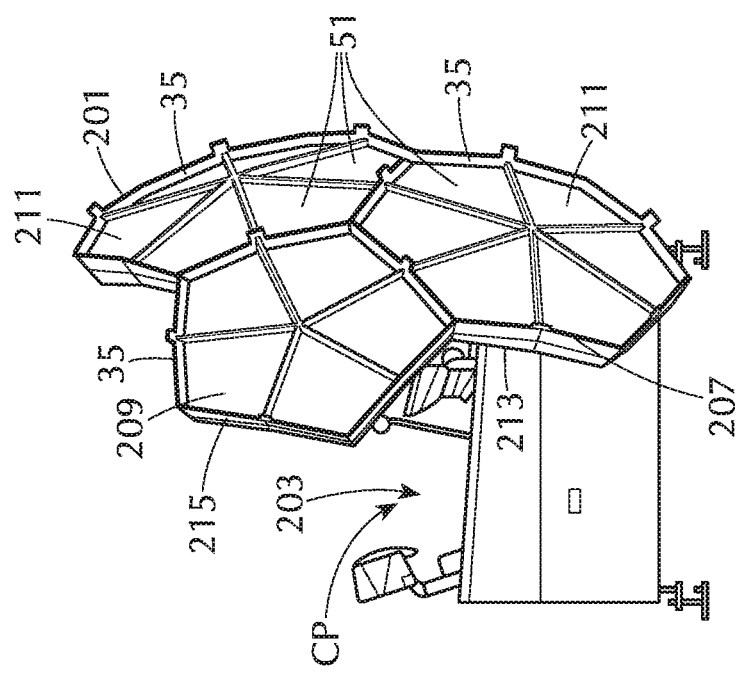
FIG. 23 is a side view of the simulator of FIGS. 21 and 22.

Referring to FIG. 24, the screen 205 provides, within its perimeter 213, the field of view appropriate to the simulated vehicle. The field of view is made up, in this embodiment, of three pentagonal screen components 209 and four hexagonal screen components 211. However, different combinations of geodesic-edged hexagons and polygons may be used to obtain differently configured fields of view.

Figure 26:
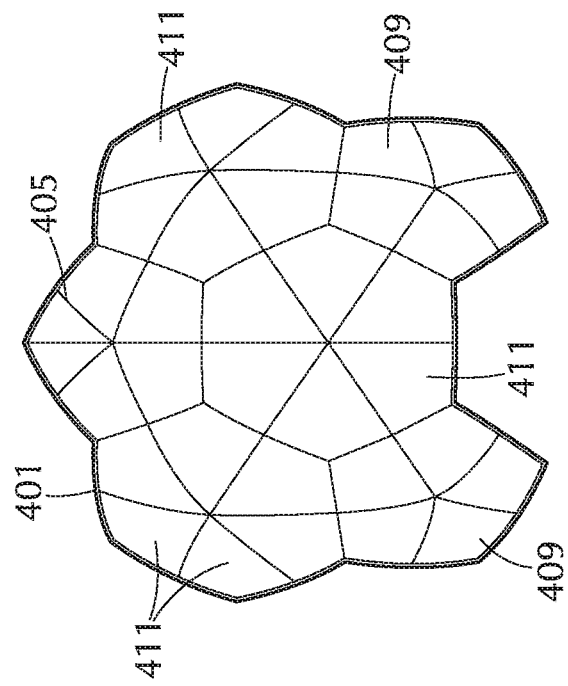
FIG. 26 is a view as in FIG. 24 of another still alternate embodiment of the display screen of the invention.
Figure 25:
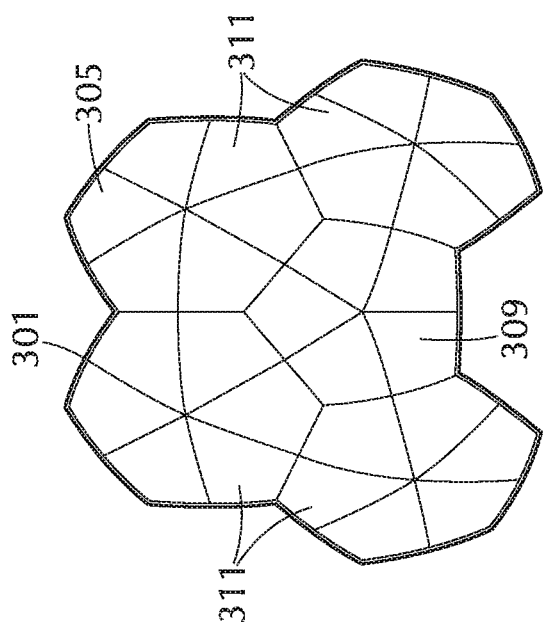
FIG. 25 is a view as in FIG. 24 of another alternate embodiment of the display screen of the invention.
Figure 28:
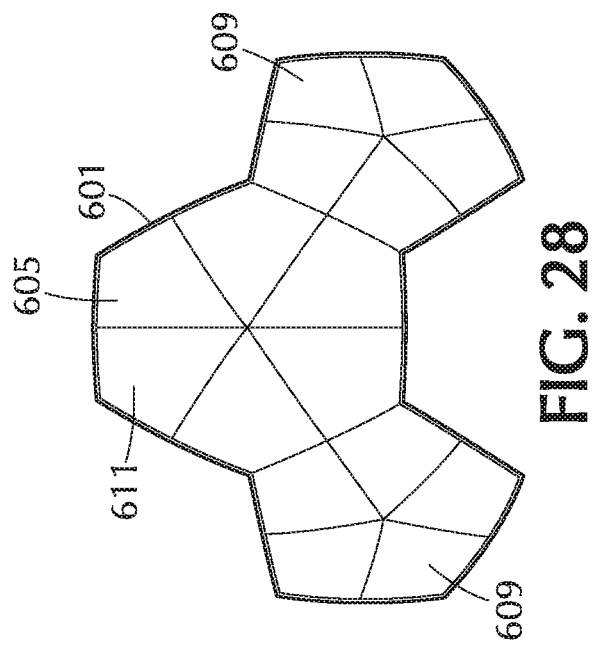
FIG. 28 is a view as in FIG. 24 of another alternate embodiment of the display screen of the invention.
Figure 27:
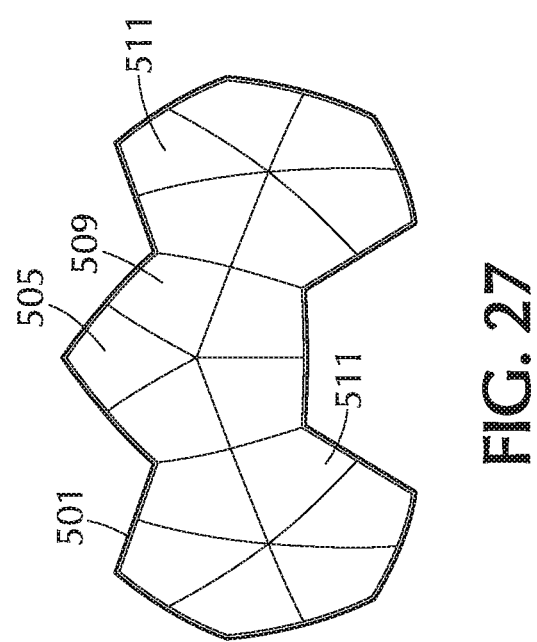
FIG. 27 is a view as in FIG. 24 of still another alternate embodiment of the display screen of the invention.

Examples of such different configuration of screens are shown in FIGS. 25 to 28. FIG. 25 shows a view of the screen surface 305 of a different screen structure 301 from the design eyepoint, Screen 305 is made up of one pentagonal subpart 309 and four adjacent hexagonal screen subparts 311. All are made up of the kite-shaped screen elements 39 described in previous embodiments. FIG. 26 shows a similar view of another arrangement of geodesic polygonal screen subparts in screen structure 401. Screen 405 is made up of three pentagonal subparts 409 and three hexagonal subparts 411. FIG. 27 shows the inside view of still another embodiment with a smaller field of view, where the screen structure 501 has a screen 505 made up of one central pentagonal subpart 209 and two adjacent hexagonal subparts 511. FIG. 28 shows the interior field of view in a screen structure 601 similar to that of FIG. 27, except that the central polygonal subpart 611 of the screen surface 605 is hexagonal, and it has two pentagonal subparts 609 adjacent to it.

It will be understood that other arrangements of screen structures may be devised that are made up of combinations of polygons composed of the kite-shaped screen elements described herein. The pattern of hexagons and pentagons applied is a subset of the well-known hexagon and pentagon pattern of a geodesic dome, and the interior display surface of the screen structures preferably lies in a sphere about a design eyepoint.

Figure 29:
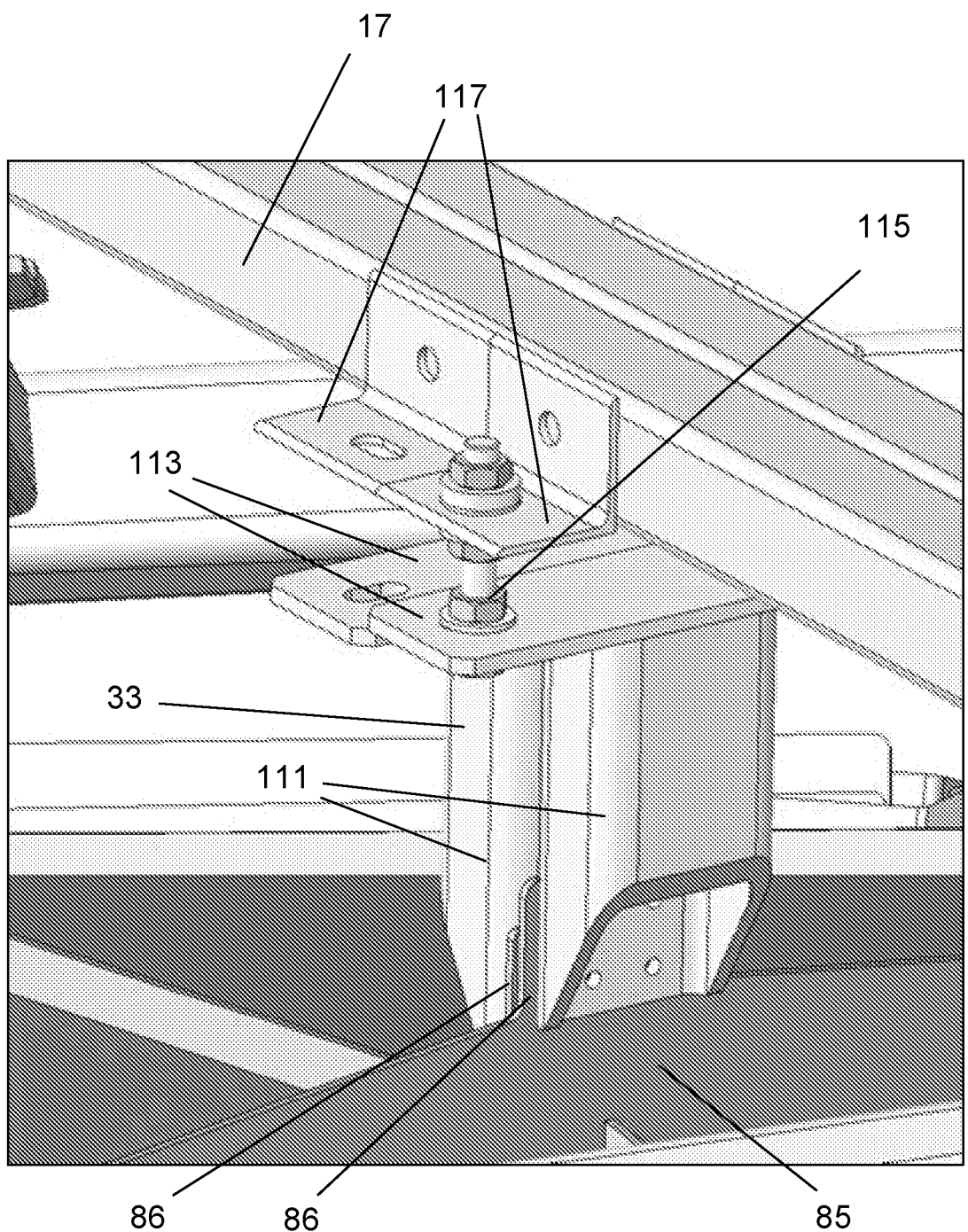
FIG. 29 is a detail view of the connection structure that supports the screen elements on the external geodesic beam frame.

FIG. 29 shows a detailed view of the connection structure 33 that connects and supports the hexagonal or pentagonal frame structures on the outer generally geodesic frame structure of the dome.

Each of the frame structures 35 has a set of outer peripheral walls extending normal and radially outward from the spherical surface of the display. As best seen in FIG. 29, each of the walls 85 has outwardly extending support tab 86. The tab 86 is connected fixedly, such as by spot welding or some other welding or mechanical method well known in the art, to a wall in a radially inward end of tubular support member 111. The radially outward ends of the support members 111 each has a transversely extending connection plate 113 affixed to it. Adjustable bolt structures 115 (shown for only one of the tubular support members 111) extend through bores in the plate 113 and in L-shaped brackets 117 that are affixed mechanically or by welding to sides of the outer frame member 17. The adjustable bolt structures 115 allow for independent adjustment and alignment of the spatial positions of the frame structures 35 so that the inward spherical display surfaces 55 of the screen elements 51 all meet in smooth continuous interior display surface 9.

It should be understood that each of the connections of the frame structures to the beams 17 of the exterior support structure is configured similarly to the connection structure 33 of FIG. 29, except where the polygonal frame 35 is that of a polygon on the edge of the display, in which case only one of the tubular support member 111 is needed.

Figure 30:
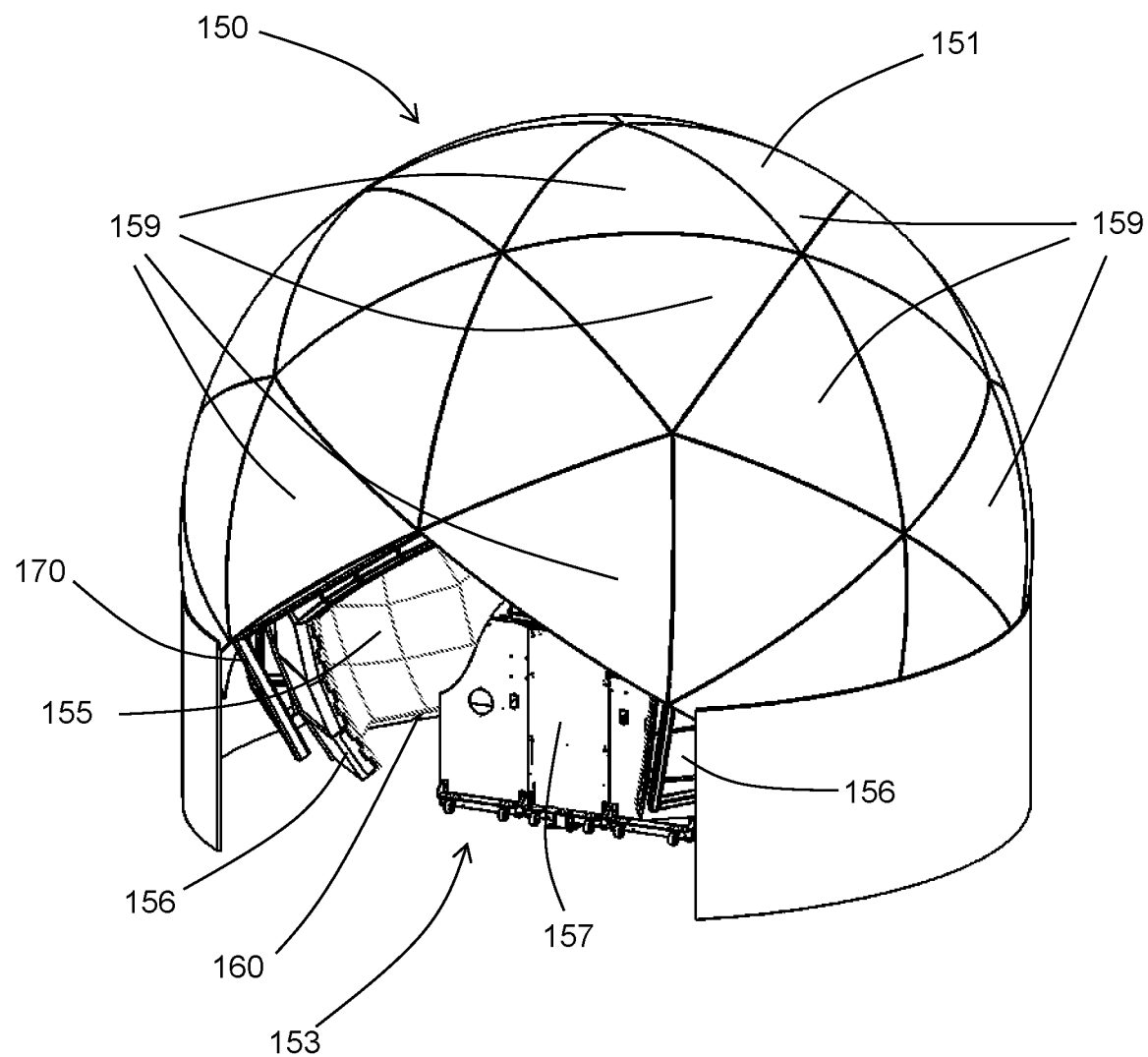
FIG. 30 is an isometric view of the exterior of an alternative embodiment of spherical display simulation system according to the invention.

Referring to FIG. 30, an alternative embodiment of simulator system generally indicated at 150 according to the invention is shown. Where not otherwise described, the structure and operation of this alternative embodiment should be understood to be identical or very similar to the structure and operation of the previous embodiment, the main distinction being the geometry of the screen elements. The different geometry, i.e., use of both kite-shaped and irregular quadrilateral screen elements, increases the number of screen elements required from about 144 to about 194, but also reduces the size of the elements relative to the pentagon/hexagon arrangement of the previous embodiment, and the smaller size reduces the cost of the elements markedly, reducing the total cost of the system.

The system 150 includes an external enclosure or spherical outer housing 151 that surrounds the entire simulator. The external housing 151 includes a door area indicated at 153 from which a door (not shown) can be rotated away to allow access to the interior of the simulator 151. The door, when closed completely, encloses the user in the simulator without external light entering, and the door itself may have an interior that serves as part of the internal spherical display surface 155 of the interior spherical display structure 156.

As in the previous embodiment, inside the simulator 150, spherical screen surface 155 extends around a user station 157, which is most commonly a simulated cockpit or a simulated vehicle control area on which the trainee sits or stands. The interior of simulator 150 is same as in the previous embodiment as seen in FIG. 2. The user station 157 is also preferably configured the same as, or similarly to, user station 11 of FIG. 2, such that when a trainee is seated in the user station 157, the eye of the trainee is close to a geometrical center of the spherical surface 155, which is identical or similar to screen surface 13 in FIG. 2, and that centerpoint also is the design eye point for the visual display. As in the previous embodiment, the distance from the central design eyepoint to the surface 155 is approximately six (6) feet, and the diameter is about twelve (12) feet. Depending on the circumstances or the application for which the simulator is provided, the distance may be less or greater than that.

The external housing 151 is mostly spherical in shape, and is composed of a number of curved, generally triangular spherical outer surface parts 159, each of which serves a constituent part of a pentagonal group of those surface parts. The pentagonal groups are supported adjacent each other so as to form the spherical outer surface 151 of the simulator 150. In the lower part of the simulator 150, the triangular surface parts 159, and the pentagonal groups of which they are a constituent part, may be truncated so that the simulator is in the form of a sphere with a truncated bottom edge 160 surrounding the user station 157.

Figure 31:
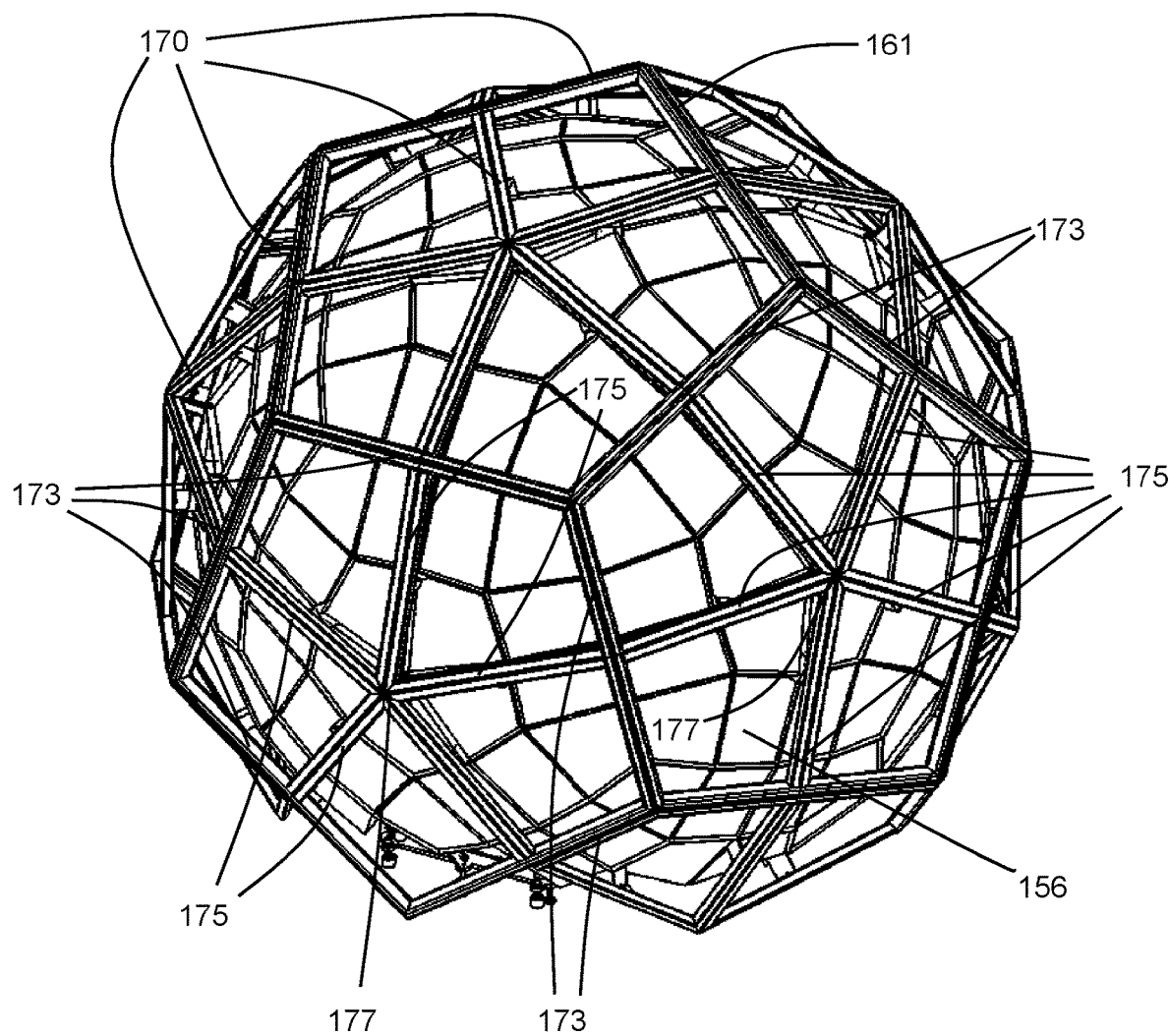
FIG. 31 is a plan view of the simulation system of FIG. 30 with the outer covering surface removed.

As best seen in FIG. 31, underneath or radially inward of the external housing or covering 151, the system 150 has a structural frame 161 supporting the interior spherical display structure 156, the interior surface of which is spherical display screen surface 155. Structural frame 161 is made up of a number of individual structural members 170 that are affixed to each other so as to form triangle structures that are in turn secured together so as to define a number of pentagonal outer beam structures. Each pentagonal beam structure is formed of five perimeter beams 173 that are joined in a pentagon, and five radial beams 175 that meet in a center 177.

All of the beams 173 and 175 are supported such that they are tangent at their midpoints to a theoretic sphere about the center design eye point of the display screen. As a result of that geometry, each pentagonal structure of beams 170 is a flattened five sided pyramidal arrangement. These pentagonal structures are connected together so as to together define the truncated sphere-shaped beam structure frame 161 that inwardly supports the spherical display screen structure 156.

Each of the pentagonal structures supports a respective radially-inwardly, generally-pentagonal segment 179 of the screen structure 156 by support structures 157. Some of the support structures 157 are shown in FIG. 31, and the structures 157 are the same as or similar to the support arrangements seen in FIGS. 13, 14, 15, and 29 in the previous embodiment, supporting frames inwardly of the beams 173 and 175.

Figure 32:
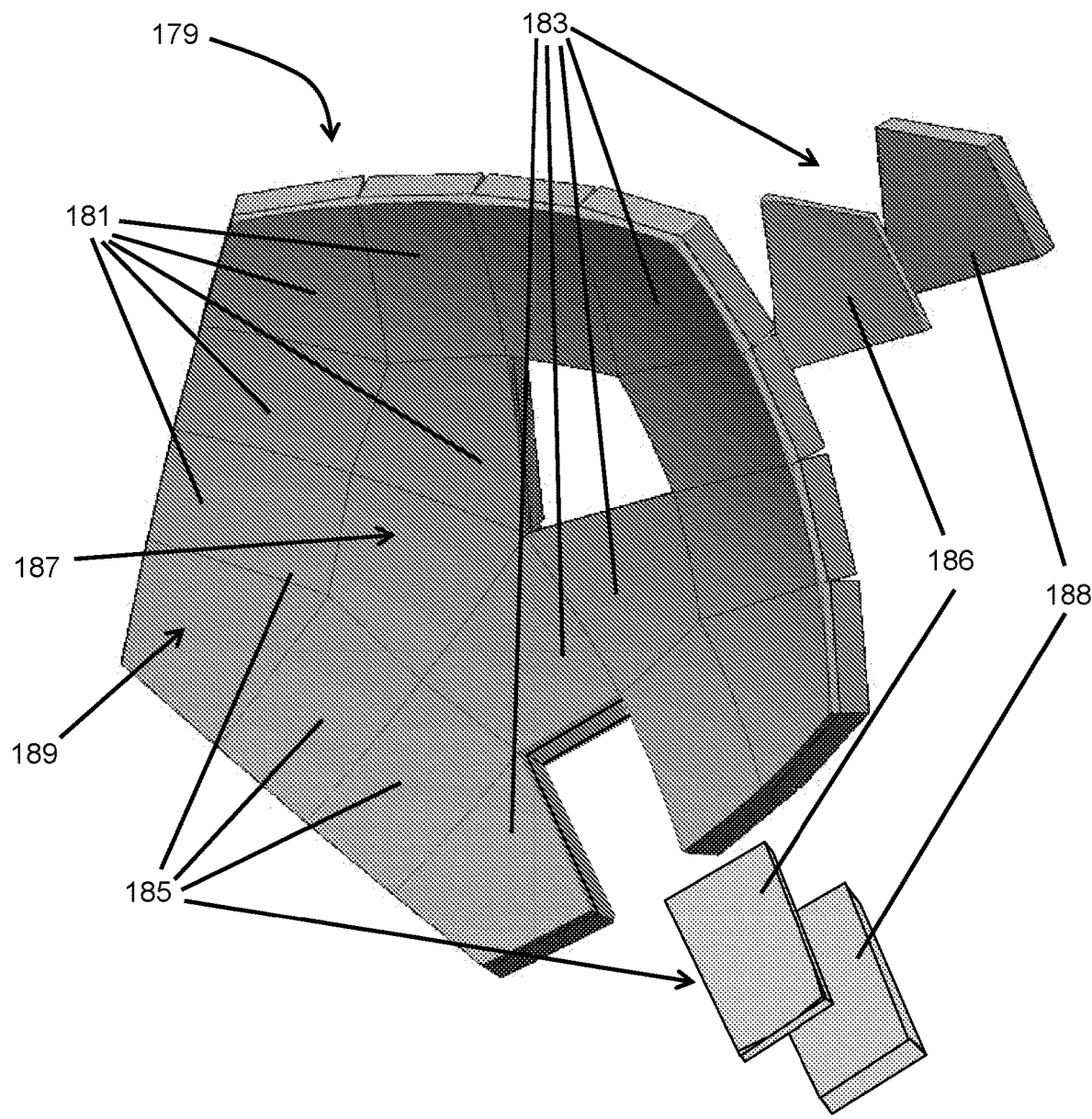
FIG. 32 is a partially exploded diagram of a pentagonal screen segment of the alternate embodiment of FIGS. 30 and 31.

Referring to FIGS. 31 and 32, the screen sphere structure 156 is divided into a number of pentagonal segments 179 that seamlessly join with each other along their edges so as to provide an uninterrupted spherical screen surface surrounding the user, as in the previous embodiment.

As best shown in FIG. 32, each of the pentagonal segments 179 of the spherical screen structure 156 is tessellated into discrete screen elements 181 that are each either a symmetrical kite-shaped element 183, or an asymmetrical quadrilateral or tetragonal element 185. Each screen element 181 whether kite-shaped or simply quadrilateral, is formed of an inwardly disposed fiber-optic faceplate 186 that functions as illustrated in FIG. 8, with a curved inner display surface that is a part of the inner concave spherical display surface 155 and a planar outer input surface that faces and engages an outwardly supported image display or light engine 188 that is shaped to match the faceplate 186 and to supply imagery as serial images of lighted pixels to the entire curved inner surface through the coherently organized optical fibers, as in the previous embodiment.

A central group 187 of five kite shaped elements 183 is supported organized as a smaller pentagonal segment 187 in the center of the pentagonal segment 179. The central pentagonal segment 187 is surrounded by a perimeter segment 189 made up of five kite-shaped elements 183 at the vertices if the inner pentagon, with two asymmetrical quadrilateral elements 185 between them. Within each pentagonal segment 179, the screen elements 183 and 185 abut each other so as to display imagery seamlessly together, so that the screen surface 155 shows imagery as continuous.

The pattern in which the screen elements 183 and 185 are supported is one in which the edges of the screen elements 181 extend along, or very close to, geodesics of the sphere of the spherical surface. As a general principle, this means that imagery on each of the screen elements 181 is the same resolution, or very close to the same resolution, along their edges and across the surface of the screen elements 181, which may be advantageous from an image generation standpoint.

Figure 33:
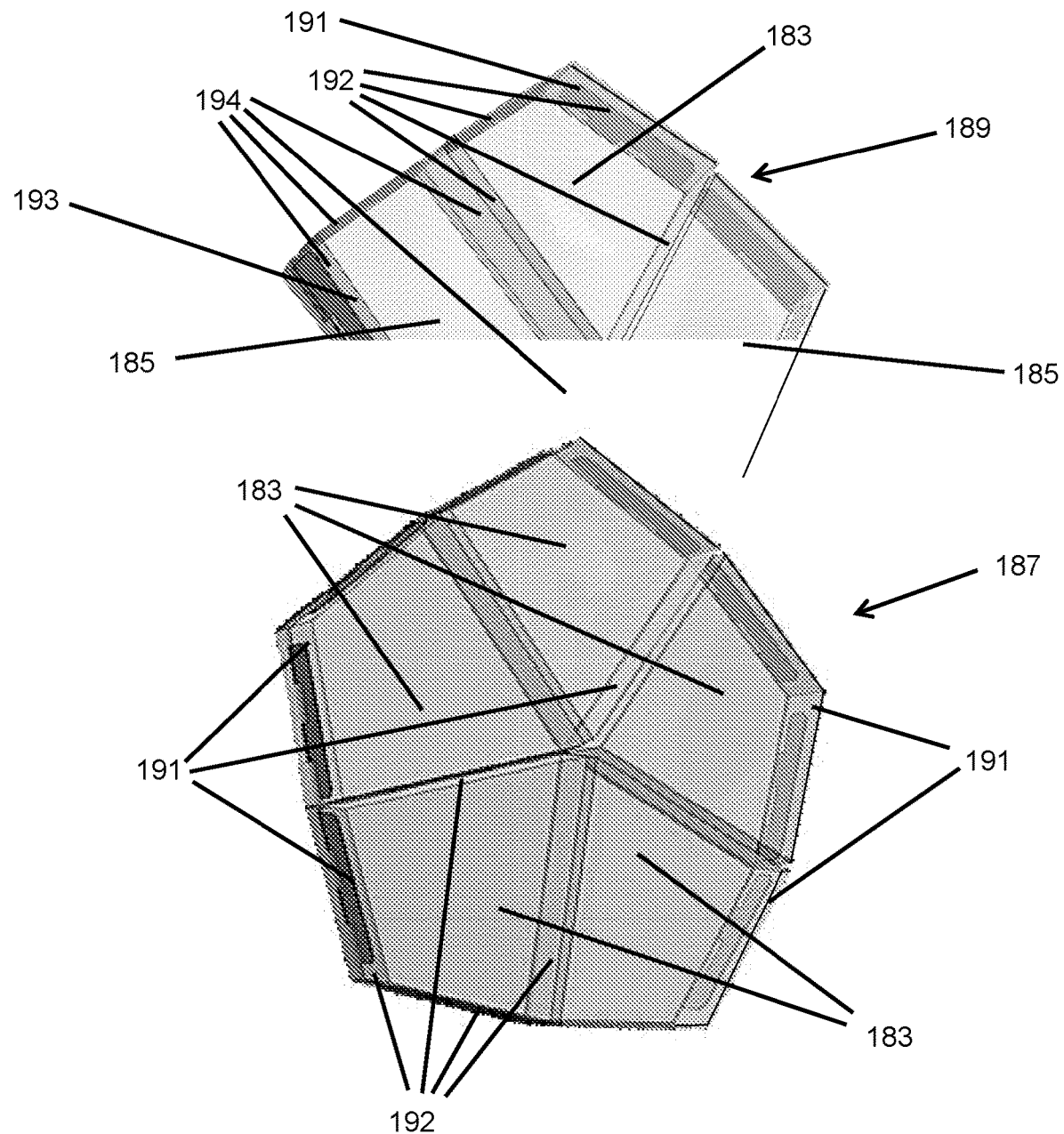
FIG. 33 is a perspective exploded view of components of the screen of the alternate embodiment with the supporting frame structures.

Referring to FIG. 33, a slightly exploded set of screen elements 181 of a pentagonal arrangement is shown, with the inner pentagonal arrangement 187 shown and representative elements 183 and 185 of the perimeter segment of the larger pentagonal perimeter shown for one of the five points of the inner pentagonal arrangement. It will be understood that the three elements 183 and 185 of this perimeter are repeated five times around the inner pentagonal arrangement 187.

The screen elements 181 are each supported in respective frame structures that are the same or very similar to the structures that support the screen elements in the first embodiment, as shown in FIGS. 13 to 15 and 29. Each kite-shaped element 183 is supported by being secured in a kite-shaped frame 191, each made up of four radially outwardly extending walls 192 that are connected with each other and supported either directly or indirectly via the other walls 192 on the outer frame 161. The quadrilateral elements 185 are also similarly supported, secured in matching quadrilateral-shaped frames 193 that have radially outwardly extending walls 194 that also are connected by support structures to the outer frame 161, or are supported on the outer frame 161 through their connections to the other walls 194 or 192 that are so supported. Attachment of the frames to the faceplates and displays is the same as in the previous embodiment.

As with the previous embodiment, all of the screen elements 183 and 185 are supported in the frames 191 and 193 angulated relative to neighboring screen elements so that the inside surfaces of the faceplates together form a continuous spherical surface. The faceplates each have radially extending planar abutment surfaces normal to the curved inner surfaces, and those abutment surfaces engage similar normal planar abutment surfaces of adjacent faceplates with the result that the inward surfaces smoothly align with each other without noticeable separating seams or discontinuities, as discussed above with respect to the first embodiment. As with the previous embodiment, the faceplates of the elements 183 and 185 are all made of optical fiber material of coherently-organized optical fibers, preferably of acrylic material. Preferably, in the material of the faceplate, all of the fibers extend in parallel, and all of the fibers extend in a direction normal to the planar surface of the faceplate inwardly to end at the concave surface 55. Alternatively, the optical fibers may be organized so that they taper so as to grow narrower as they extend outward from the interior concave spherical surface.

A similar principle of each element's configuration applies to the elements 183 and 185 of the second embodiment. The inner surface of the faceplate is a part of the spherical inner display surface 155. The shape of the screen element 181, whether kite-shaped or irregular quadrilateral, is the shape of the element at the inner surface. The sides of the elements 181 are each planar and extend initially directly radially away from the design eye point. At some point, the planar side angles inward to be parallel to the fiber optics, which lead to a planar image input surface. That surface is engaged with the associated matching display panel.

The kite-shaped elements 183 are also essentially identical to the screen elements as illustrated in FIGS. 6a, 6b, 7, 8, 11 and 12, and particularly the kite-shaped elements 39a of the pentagon arrangements of the first embodiment, which have almost the same dimensions.

Figure 34:
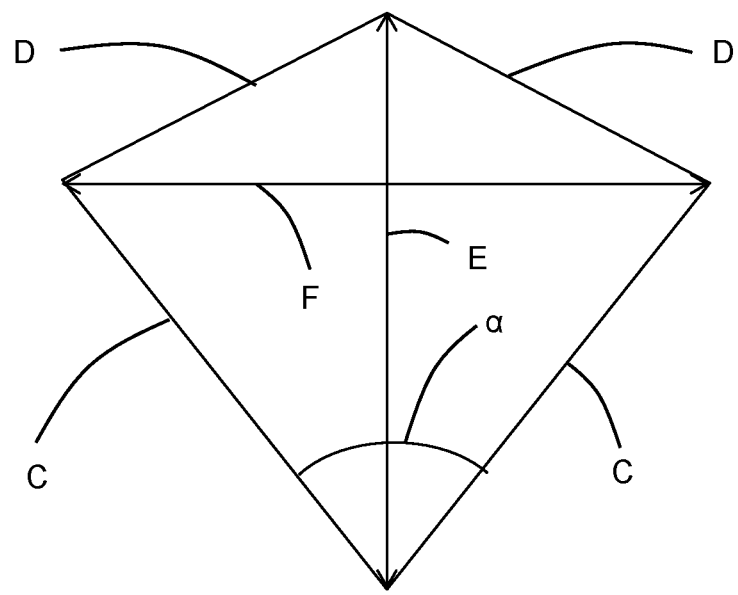
FIG. 34 is a diagram of the shape of the kite-shaped screen elements or faceplates in the alternate embodiment spherical display system.

Referring to FIG. 34, the shape and dimensions of the outer planar sides of the symmetrical kite-shaped elements 183 are shown. The outer sides of the elements 183 have long sides C with a length of 20.509 inches and short sides D with a length of 13.822 inches. The overall longer-axis length E of the kite shaped elements 185 is 23.650 inches, and the shorter axis length F of the elements 183 is 23.870 inches. The vertex angle $\alpha$ of the kite-shaped element 183 is 71.18 degrees. The dimensions on the other side, i.e., the inward spherical surfaces of the faceplates of the kite-shaped elements, are slightly different due to the geometry of the structure.

Figure 38:
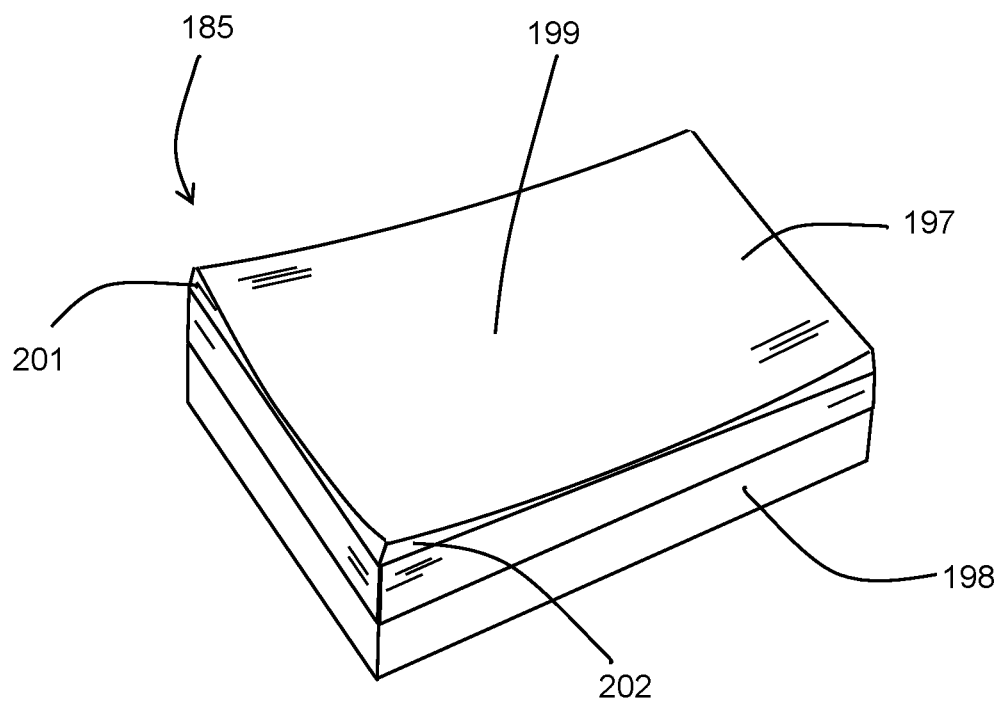
FIG. 38 is an isometric detail view of the faceplate of an asymmetrical quadrilateral screen element.

Referring to FIG. 38, the quadrilateral elements 185 are all also composed of a faceplate 197 and a conformingly shaped light engine or display 198 that is connected with electronics to receive imagery and display it as pixels of output light on its planar face. The coherent fiber-optic faceplate 197 has a cross-section that operates as illustrated in FIG. 8 and receives this light and transmits it to the inward concave face 199 of the faceplate 197, which is a continuous portion of the curved display surface 155 from the adjacent elements 183 and 185. As with elements 183, the faceplate has a planar outer surface facing the associated light engine panel and matched in size to it, and the fiber optics are preferably parallel and normal to the planar outer surface of the faceplate. The entire inner surface of the faceplate is made up the ends of optical fibers that carry light to it from the light engine, so the entire inner surface of the faceplate is illuminated by imagery from the associated light engine or display panel.

The light engine or image panel 198 has a planar inward surface that is also a quadrilateral that is substantially equal in size and dimension to the outer planar surface of the faceplate 197. The image panels or light engines are the same or similar to the image panels of the first embodiment, and all image panels are all connected with an image generator that generates the specific series of images that are displayed on the panels to represent that portion of a virtual environment in which the simulation training is conducted.

The planar abutment surfaces 201 and 202 are along geodesics of the spherical screen, and also are normal to the surface 199 and serve to engage with adjacent faceplates so that the surface 199 smoothly meets with the surfaces of the adjacent faceplates without any irregularities.

Figure 35:
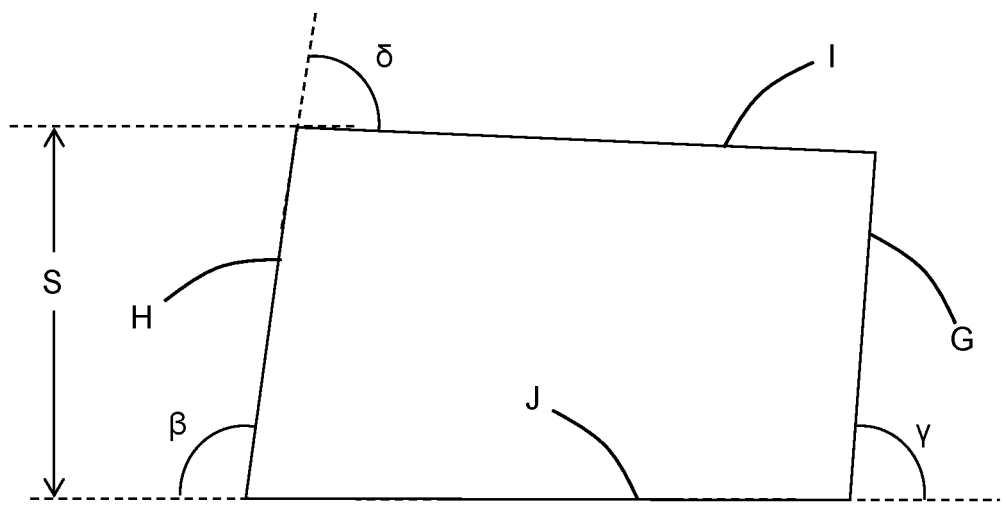
FIG. 35 is a diagram of the shape of the asymmetrical quadrilateral screen elements or faceplates in the alternate embodiment spherical display system.

The dimensions of the planar outer sides of the asymmetrical quadrilateral elements 185, as well as the dimensions and shape of the associated light engine display panels, are illustrated in FIG. 35. The asymmetrical quadrilaterals are either in the shape shown or in a mirror image, and all have four different sides G, H, I and J. Side J is dimensioned so that the inner side of the faceplate with the curved convex surface is of the required size and shape to extend adjacent and match the inward curved edge of long side C of the kite shaped elements 183, and side H is similarly dimensioned so that the corresponding inward side edge of side H is configured and sized to meet and match the corresponding inward side edge of side C of the kite-shaped elements 183. Side G of each quadrilateral has an inward side edge that matches the inward side edge of the side G on the adjacent screen element 185, and side I has an inward edge portion that abuts the inward side edge of side I of another adjacent element 185. The surfaces of all elements meet smoothly without interruption. The precise dimensions of side J on the planar outer side of the faceplate of element 185 is 20.423 inches, and the height S of the quadrilateral on the planar outer side is 13.794 inches. Angles β, γ, and δ are respectively 96.73 degrees, 86.18 degrees, and 86.26 degrees. The quadrilateral light engine panel has a shape and size that is the same as or close to the shape and dimension of the quadrilateral of FIG. 35.

Figure 36:
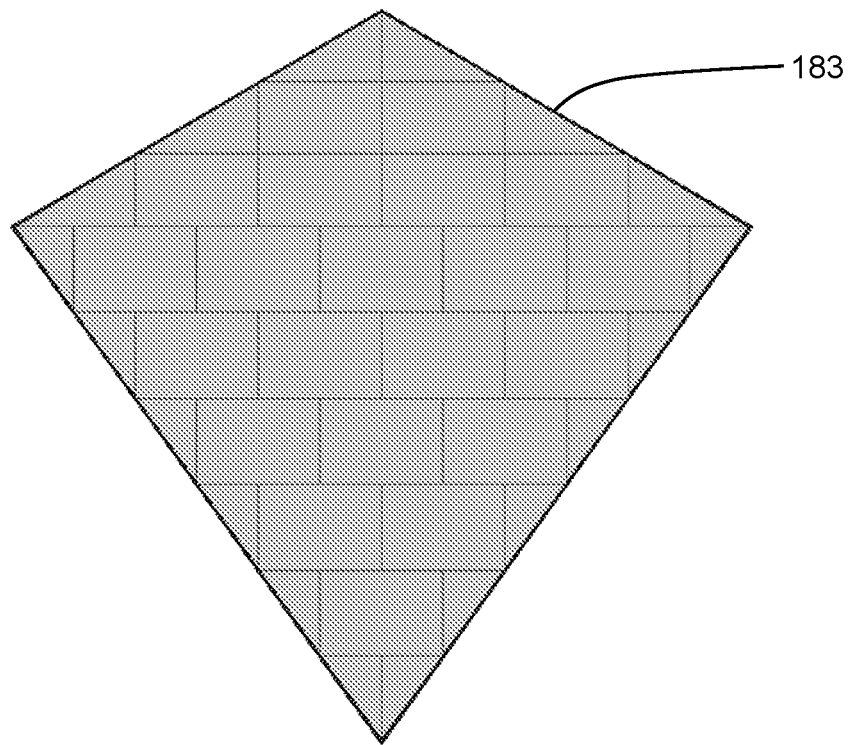
FIG. 36 is a diagram of a configuration of subsidiary pixel-display screen sub-elements for the pixel field of the display image panel of one of the kite-shaped screen elements in the alternate embodiment.

FIG. 36 shows the constituent pixel sub-panels that may be used effectively to produce the light engine display panel for the kite shaped elements 183. This pattern is essentially identical to the pattern of rectangular or triangular sub-panels for the kite-shaped elements of the first embodiment. In FIG. 16. The same technology and materials are sued for this embodiment as the previous embodiment.

Figure 37:
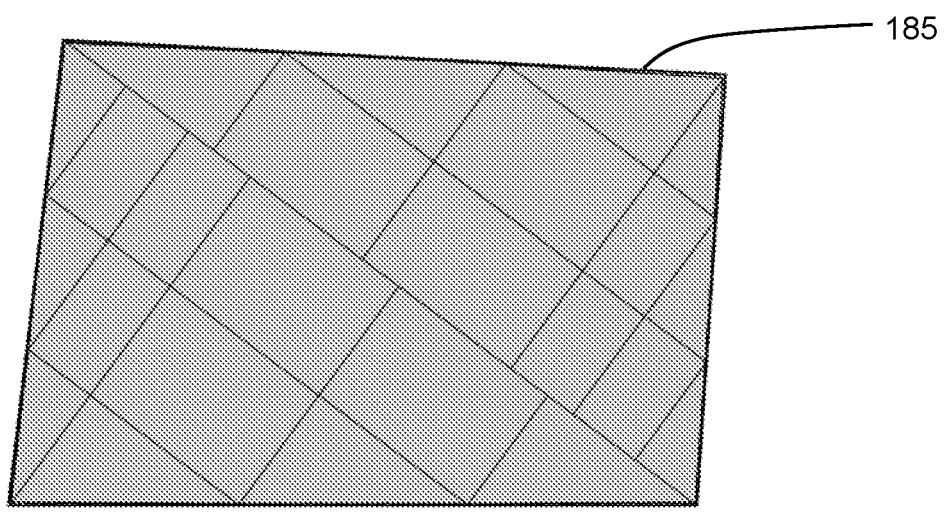
FIG. 37 is a diagram of a configuration of subsidiary pixel-display screen sub-elements for the pixel field of the display image panel of one of the asymmetrical quadrilateral screen elements in the alternate embodiment.

FIG. 37 shows an arrangement of the same triangular and rectangular elements used in the kite-shaped element 183 for formation of the light engine for the asymmetrical quadrilateral element 185. Again, the same technology, components and materials are used for this panel as in the previous embodiment.

While the embodiments shown have provided a concave spherical display surface, the invention may be used to provide display screens with other geometries, such as a concave cylindrical display screen.

Figure 39:
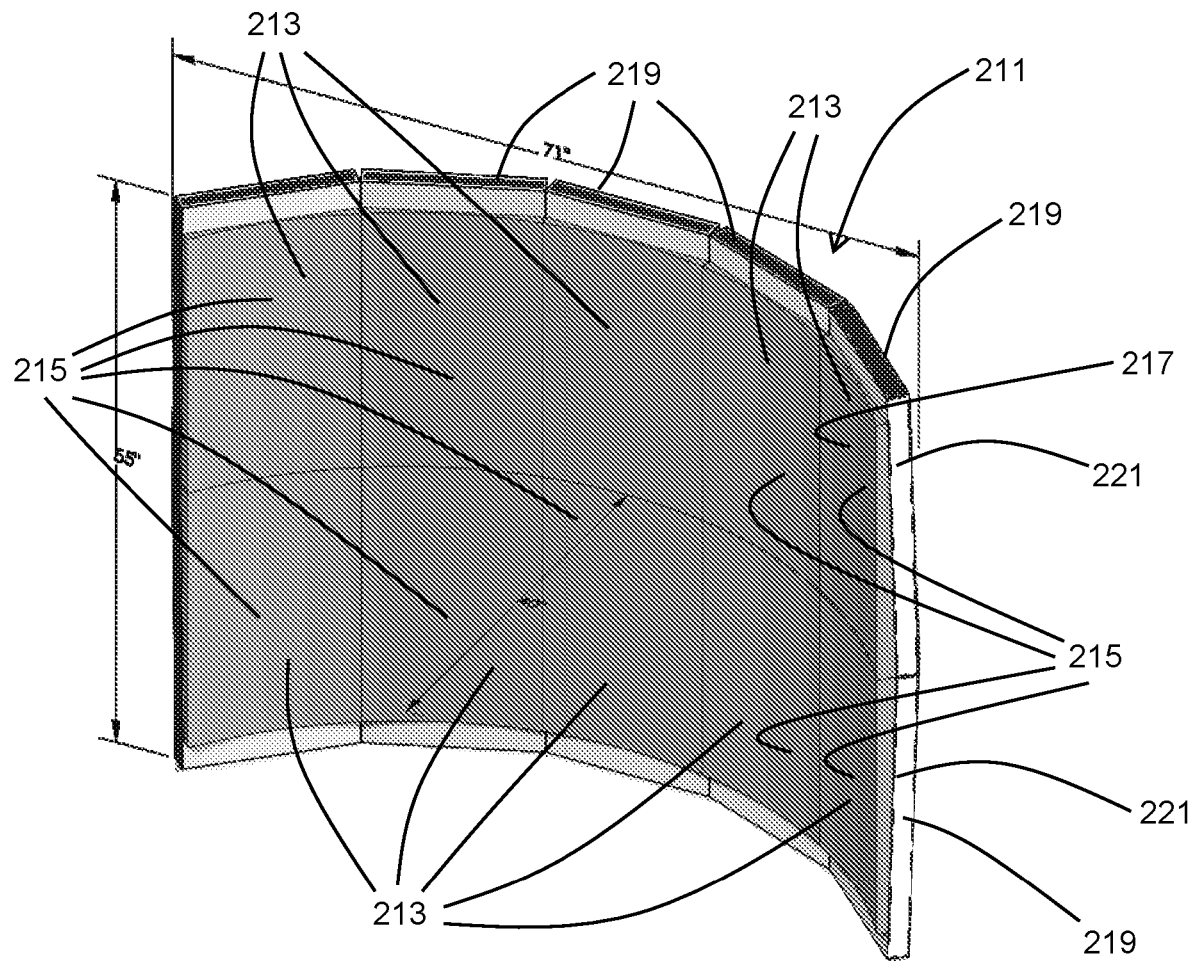
FIG. 39 is a perspective view of still another alternate embodiment of display screen structure.
Figure 40:
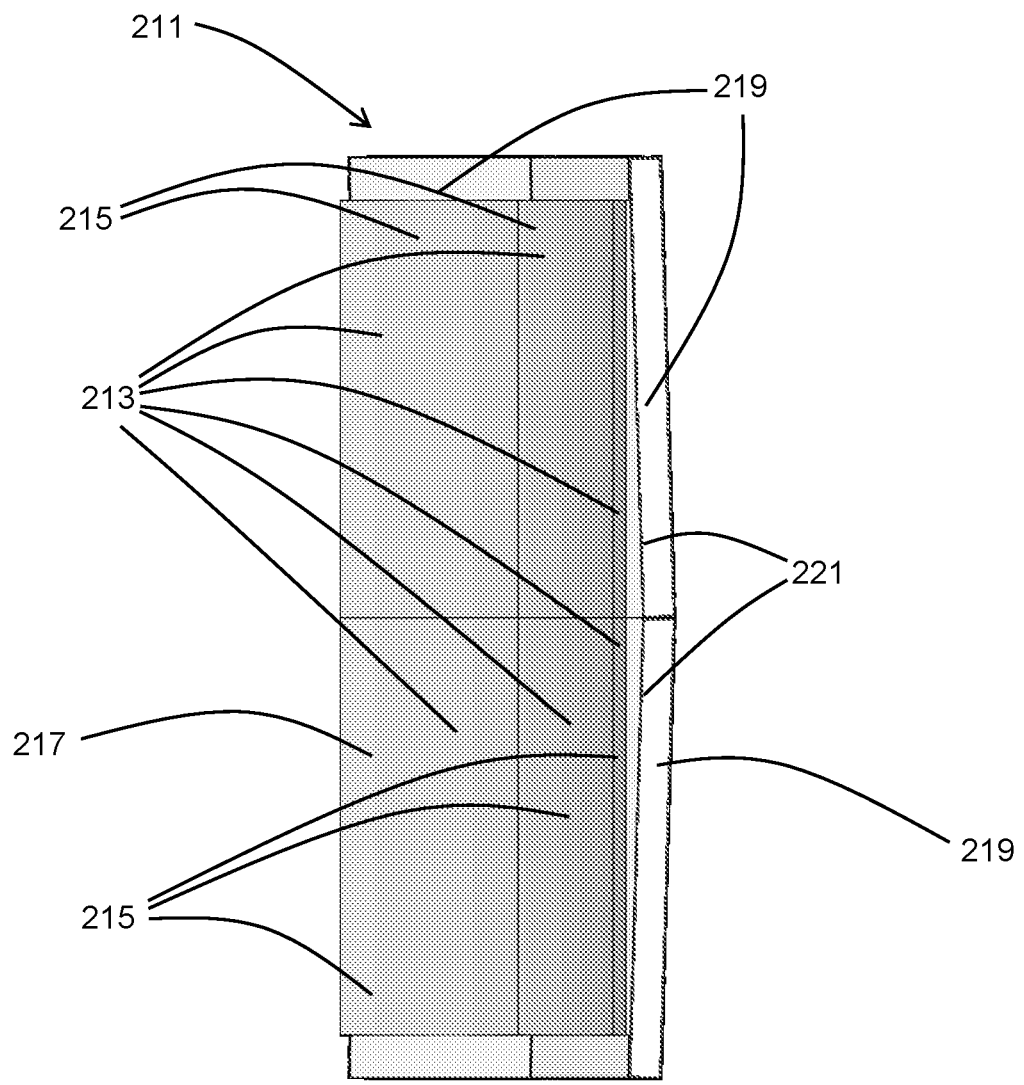
FIG. 40 is a cross-sectional view through a vertical centerline of the embodiment of FIG. 39.

FIGS. 39 and 40 show such a display system. The cylindrical display system 211 is made up of an upper and a lower row of essentially identical rectangular elements 213. Each of the elements 213 includes and inwardly concave faceplate 215 the inward surface of which is a segment of the larger inwardly concave cylindrical display surface 217. Each of the elements 213 also has a respective light engine or image display panel 219 that faces a planar outer surface 221 of the faceplates 215.

In the embodiment shown, the radius of curvature about a vertical axis through a design eye point is about 40 inches. The height of the screen 211 is preferably about 55 inches and its width is about 71 inches.

Each faceplate is configured similarly to the faceplates of the previous embodiments, with coherently organized fiber optics, as described above. The fiber optics carry the light from the light engines 219 to the inward surface 215 to be displayed to a user.

Figure 41:
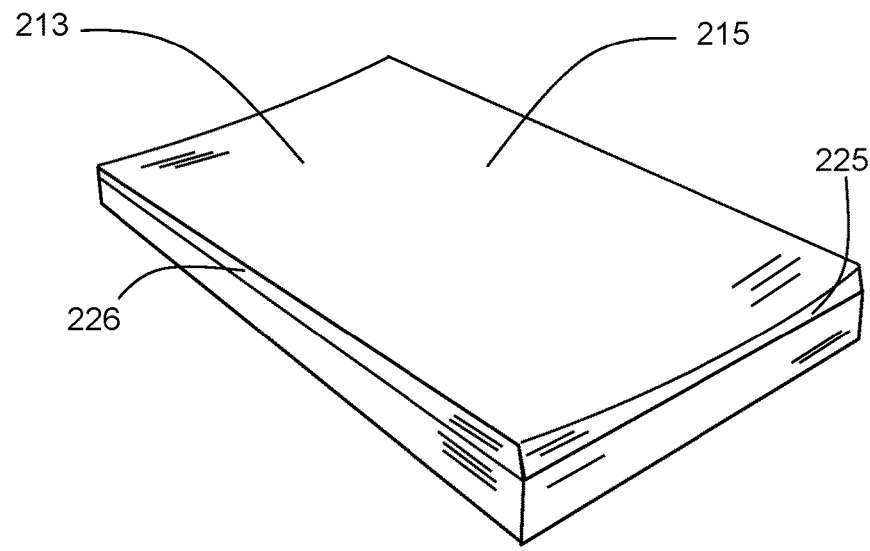
FIG. 41 is an isometric detail view of the faceplate of a screen element of the embodiment of FIG. 39.

Referring to FIG. 41, the faceplate 223 of a cylindrical screen element is shown. The internal concave cylindrical surface 215 is constant over the length of the faceplate, as a section of the cylinder. Faceplate 223 also has abutment surfaces 225 and 226 that are planar and normal to the inward cylindrical surface 217.

Figure 42:
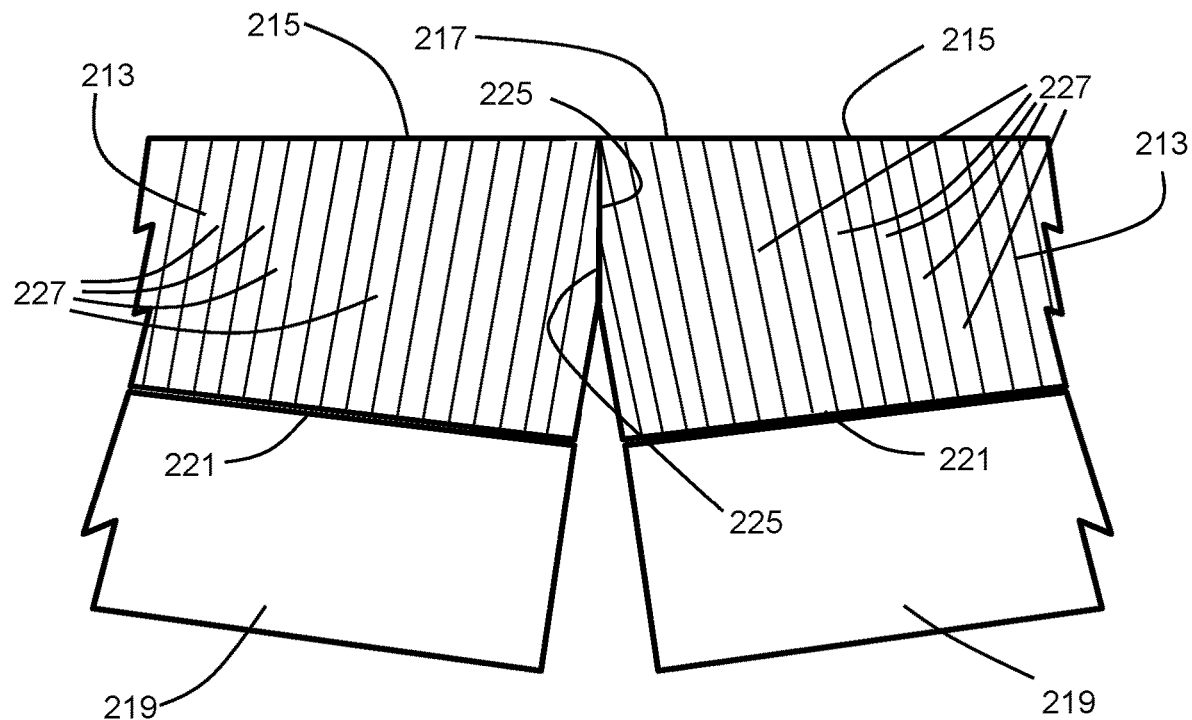
FIG. 42 is a detail view of the horizontal connection between top and bottom faceplates and their light engines in of the embodiment of FIG. 39.

As best seen in FIG. 42, the abutment surfaces 225 engage each other between the faceplates of the upper and lower rows of the display 211. This results in vertical linear alignment of the cylindrical surfaces 215 of the elements 213 surface, which also provide for a clearance angulation between the light engines 219 of the upper and lower rows of the display 211. Abutment surfaces 226 of adjacent elements 213 of the upper and lower rows provide for the continuous cylindrical curvature between those adjacent elements 213.

Optical fibers 227 are coherently arranged to transmit the images from the light engines 219 to the concave cylindrical surface from the planar surface 221 of the faceplate 223. 223. The fibers 227 are perpendicular to the planar outer surface 221 of the faceplate 223. The angulation of the planar outer surface and the light engine give the faceplate 223 a tapering thickness over their vertical heights, while their horizontal cross section remains constant over that vertical height.

The terms used herein should be read as terms of description rather than of limitation. While embodiments of the invention have here been described, persons skilled in this art will appreciate changes and modifications that may be made to those embodiments without departing from the spirit of the invention, the scope of which is set out in the claims.

What is claimed is:

1. A display system comprising:
   a screen having a concave screen surface positioned so as to be visible to a user of the system;
   said screen comprising a plurality of screen elements supported adjacent one another so as to form said concave screen surface, each of the screen elements comprising
   a respective faceplate comprising optical fibers extending adjacent each other so as to transmit light therethrough between two opposing faceplate surfaces;
   one of said faceplate surfaces being a concave display image output surface; and
   the other of said faceplate surfaces being an image input surface; and
   a respective light engine having a field of pixels each transmitting light corresponding to serial images of said light engine; and
   the fibers of the faceplate receiving the light of the pixels of the light engine and together transmitting said light from the light engine coherently to the image output surface thereof so that the images of the light engine are displayed on the image output surface; and
   said faceplates abutting each other along adjacent edges thereof with the image output surfaces of said faceplates together forming a substantially smooth and continuous curved portion of the screen surface so that the imagery displayed on the screen surface through said faceplates from the associated light engines is continuous between said faceplates; and
   wherein some of the screen elements are kite-shaped having two short sides and two long sides, and being configured so that the screen elements together form a hexagonal or pentagonal portion of the concave screen surface.

2. The display system of claim 1 wherein the input surfaces of the faceplates of the kite-shaped screen elements are substantially planar and kite-shaped, and the images from the light engines are kite-shaped and substantially the same size as the input surface of the associated faceplate.

3. The display system of claim 2 wherein the faceplates are supported in a hexagonal or polygonal frame supported on a support structure surrounding the screen.

4. The display system of claim 2 wherein the light engines are each an image panel display that forms images thereon using a pixel field of LEDs.

5. The display system of claim 4 wherein the LEDs are OLEDs.

6. The display system of claim 2 wherein the light engines are each an image panel display that forms images thereon using a pixel field of LCDs and a backlight.

7. The display system of claim 2 wherein at least one of the light engines is a projector.

8. The display system of claim 2 wherein the light engine generates only infra-red light that can be seen by a user wearing night-vision goggles.

9. The display system of claim 1 wherein the optical fibers of the faceplate are all affixed together and extending in a straight path normal to the image input surface to the concave image output surface.

10. The display system of claim 9 wherein the optical fibers have ends in the image output surface, and said ends are configured to transmit light from the optical fiber in an omnidirectional or scattered light pattern.

11. The display system of claim 10 wherein the system includes an image generator generating imagery to be displayed on the surface, said image generator compensating for distortion in the faceplate between a center portion of the faceplate and a portion closer to an edge thereof.

12. The display system of claim 1 wherein the screen is a spherical screen and the curved surface is at least a portion of a sphere that surrounds a user station configured to receive a human user, said user station configured such that the user when received thereby is positioned such that the user's eye is in a region of a centerpoint of the sphere.

13. The display system of claim 12 wherein the curved surface constitutes at least a hemisphere of display screen surrounding the user 360 degrees in at least one plane passing through the centerpoint of the sphere.

14. The display system of claim 1 wherein the concave screen surface is spherical and constitutes at least a portion of a sphere.

15. The display system of claim 1, wherein the screen elements are configured to form a pentagonal portion of the screen.

16. The display system of claim 1, wherein the screen elements are configured to form a hexagonal portion of the screen.

17. A display system comprising:
a screen having a concave screen surface positioned so as to be visible to a user of the system;
said screen comprising a plurality of screen elements supported adjacent one another so as to form said concave screen surface, each of the screen elements comprising
a respective faceplate comprising optical fibers extending adjacent each other so as to transmit light therethrough between two opposing faceplate surfaces;
one of said faceplate surfaces being a concave display image output surface; and
the other of said faceplate surfaces being an image input surface; and
a respective light engine having a field of pixels each transmitting light corresponding to serial images of said light engine; and
the fibers of the faceplate receiving the light of the pixels of the light engine and together transmitting said light from the light engine coherently to the image output surface thereof so that the images of the light engine are displayed on the image output surface; and
said faceplates abutting each other along adjacent edges thereof with the image output surfaces of said faceplates together forming a substantially smooth and continuous curved portion of the screen surface so that the imagery displayed on the screen surface through said faceplates from the associated light engines is continuous between said faceplates;
wherein some of the screen elements are kite-shaped;
wherein the input surfaces of the faceplates of the kite-shaped screen elements are substantially planar and kite-shaped, and the images from the light engines are kite-shaped and substantially the same size as the input surface of the associated faceplate; and
wherein the kite-shaped faceplates each have four planar side walls that are perpendicular to the planar image input surfaces thereof.

18. The display system of claim 17 wherein the planar side walls are fixedly secured to support structures that hold said faceplates in position such that the faceplates provide a continuous and smooth spherical display surface.

19. The display system of claim 17 wherein the faceplates have planar surfaces outward of the concave display image output surfaces thereof that are normal to the image output surfaces and angled with respect to the planar side walls.

20. The display system of claim 19 wherein the planar surfaces of adjacent faceplates abut each other so that the image output surfaces thereof form a substantially smooth and continuous portion of a display surface.

21. A display system comprising:
a screen having a concave surface positioned so as to be visible to a user of the system;
said screen comprising a plurality of screen elements supported adjacent one another so as to form said concave surface, each of the screen elements comprising
a respective faceplate comprising optical fibers extending adjacent each other so as to transmit light therethrough between two opposing faceplate surfaces;
one of said faceplate surfaces being a concave display image output surface; and
the other of said faceplate surfaces being an image input surface; and
a respective light engine having a field of pixels each transmitting light corresponding to serial images of said light engine; and
the fibers of the faceplate receiving the light of the pixels of the light engine and together transmitting said light from the light engine coherently to the image output surface thereof so that the images of the light engine are displayed on the image output surface; and
wherein some of the elements are kite-shaped and some of the screen elements are asymmetrical quadrilateral shaped, and five of the kite-shaped elements are supported in a pentagonal arrangement, and five additional kite shaped elements and at least five asymmetrical quadrilateral elements together form a pentagonal perimeter area around the pentagonal arrangement.

22. A component for a display system, said component further comprising:

a faceplate comprising a number of optical fibers secured therein, each of said fibers having a first end supported in a planar surface of the faceplate and a second end opposite to the first end supported in a concave surface of the faceplate;

the first end being configured so as to receive light from an image engine associated with the faceplate; and the second end being configured so as to transmit the light from the first end in a diffused pattern;

the faceplate having a symmetrical kite shape with two connected short edges and two long edges meeting at an angle;

the short edges of the faceplate extending along respective geodesic portions of the concave spherical surface, and said faceplate having planar side walls extending normally away from the concave spherical surface;

the angle and kite shape being such that the faceplate can be combined with a number of other faceplates so as to form a regular polygon having five or six peripheral sides of equal length.

23. The component of claim 22, wherein the entire concave spherical surface of the faceplate is made up of the second ends of the optical fibers and the planar face of the faceplate has a kite-shaped input field entirely made up of the first ends of the fibers, said fibers being organized so as to coherently transmit light of an image applied to the input field to the entire concave spherical surface thereof.

24. The component of claim 23, wherein the fibers extend parallel to each other and the fibers extend normal to the planar surface of the faceplate.

25. The component of claim 23 wherein the fibers taper so that the light of the image is transmitted to the concave spherical surface substantially without distortion or variation in intensity.

26. The component of claim 23, and further comprising a light-transmitting image source supported so as to transmit light of images to all of the fibers in the input field, said image source comprising an LED or LCD screen having a kite shape corresponding to the kite shape of the faceplate and supported adjacent thereto, or a projector projecting a kite-shaped image onto the input field.

* * * * *